United States Patent
Sano

(10) Patent No.: US 7,218,461 B2
(45) Date of Patent: May 15, 2007

(54) IMAGE PICKUP LENS, IMAGE PICKUP APPARATUS AND MOBILE TERMINAL

(75) Inventor: Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/406,401

(22) Filed: Apr. 19, 2006

(65) Prior Publication Data

US 2006/0238894 A1    Oct. 26, 2006

(30) Foreign Application Priority Data

Apr. 22, 2005    (JP) .............................. 2005-124843

(51) Int. Cl.
*G02B 9/12* (2006.01)
*G02B 13/18* (2006.01)

(52) U.S. Cl. ....................................... 359/791; 359/716
(58) Field of Classification Search ................ 359/791, 359/716

See application file for complete search history.

(56) References Cited

U.S. PATENT DOCUMENTS

| 6,844,989 B1 * | 1/2005 | Jo et al. ...................... 359/716 |
| 6,930,841 B2 * | 8/2005 | Sato ........................... 359/784 |
| 2004/0190158 A1 * | 9/2004 | Sato ........................... 359/690 |

* cited by examiner

*Primary Examiner*—Scott J. Sugarman
(74) *Attorney, Agent, or Firm*—Finnegan, Henderson, Farabow, Garrett & Dunner, L.L.P.

(57) ABSTRACT

An image pickup lens for forming image of a subject on a solid-state image pickup element includes: a first lens having a positive refractive power in a meniscus shape whose convex surface faces to an object side of the image pickup lens; an aperture stop; a second lens having a positive refractive power in a meniscus shape whose convex surface faces to an image side of the image pickup lens; a third lens having a negative refractive power whose concave surface faces to an object side of the image pickup lens. The first lens, the aperture stop, the second lens and the third lens are arranged in this order form an object side of the image pickup lens. The first lens and the third lens satisfy a predefined conditional expression.

9 Claims, 20 Drawing Sheets

FIG. 19
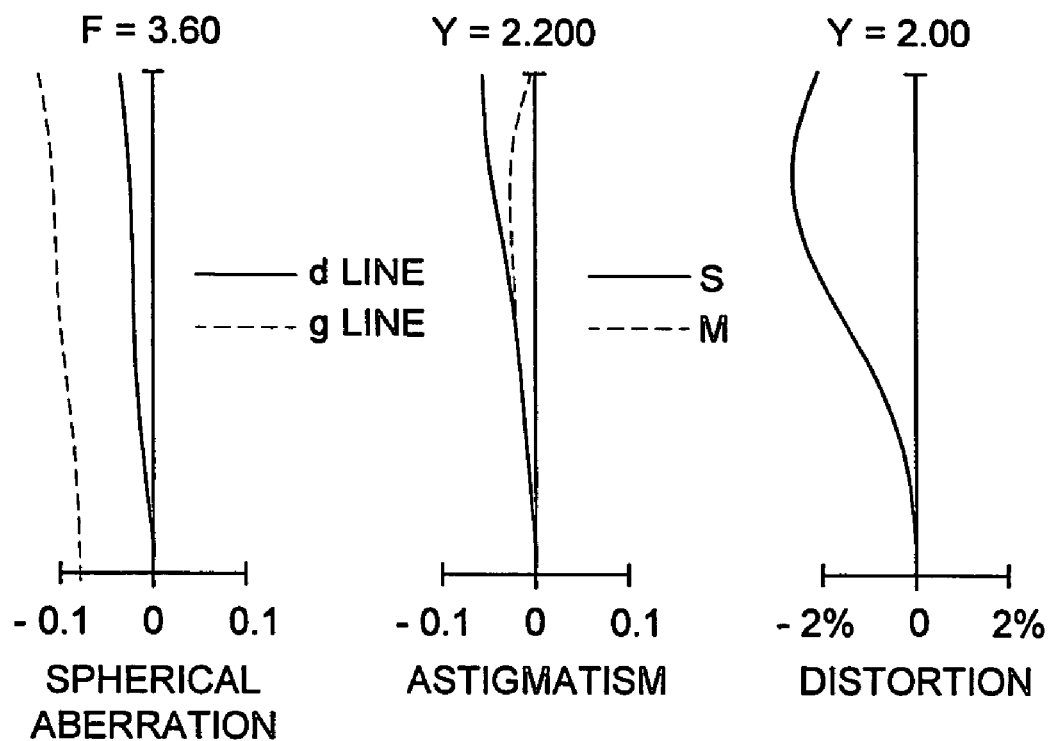
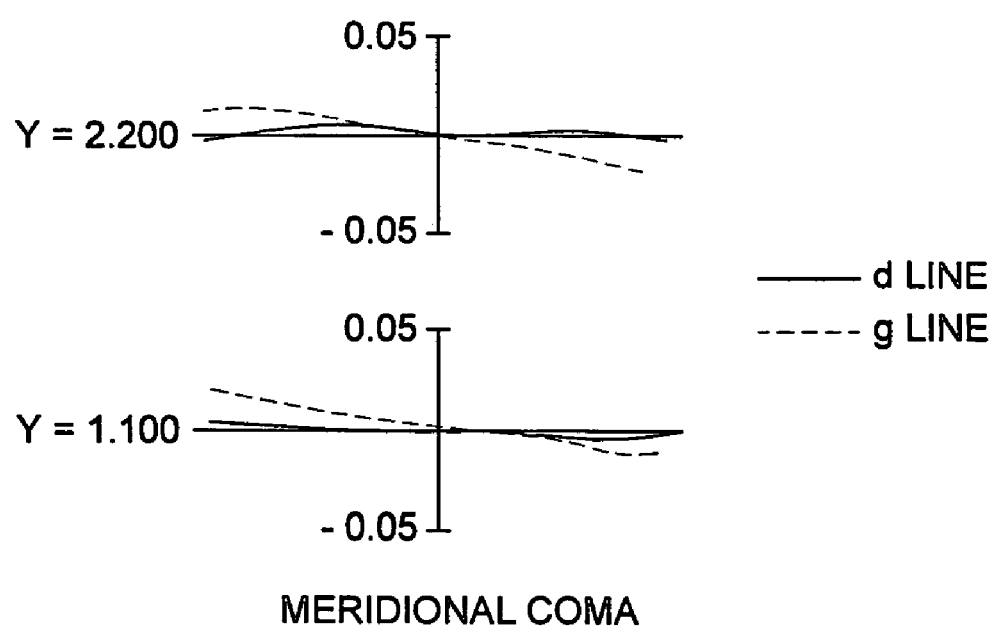

FIG. 21
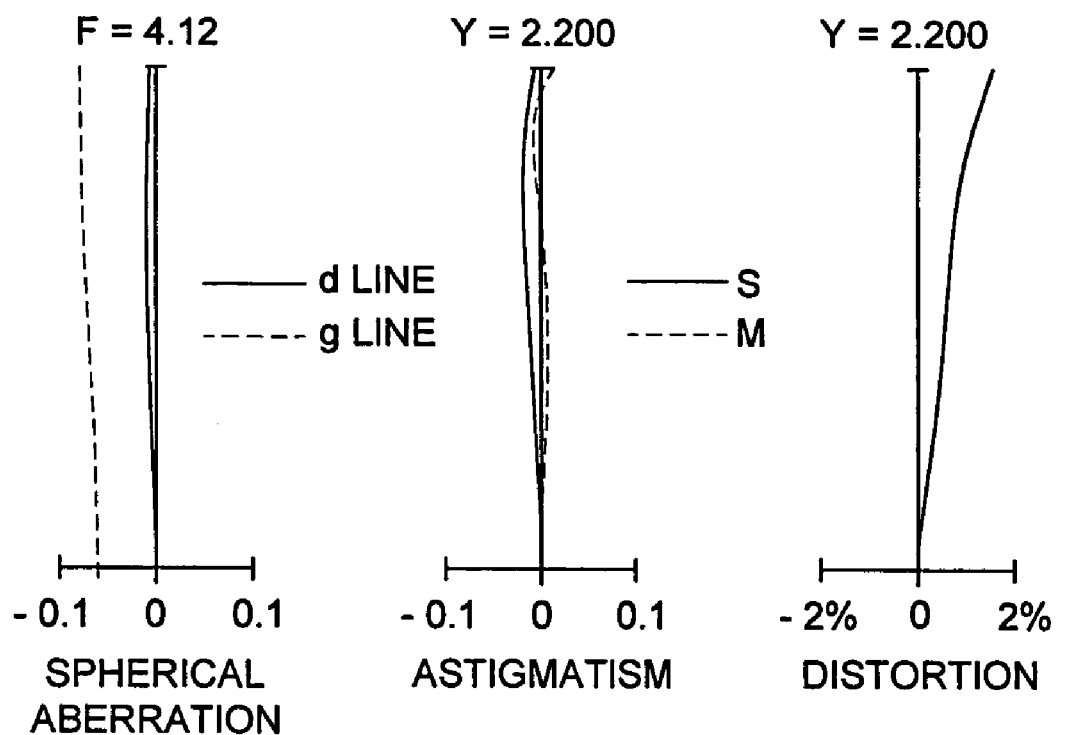
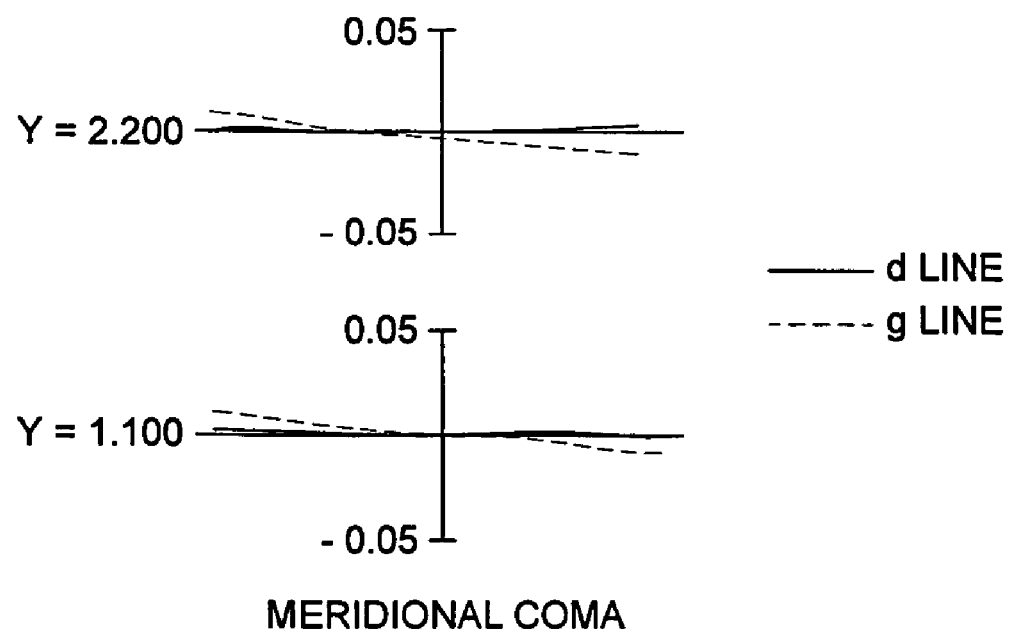

FIG. 23
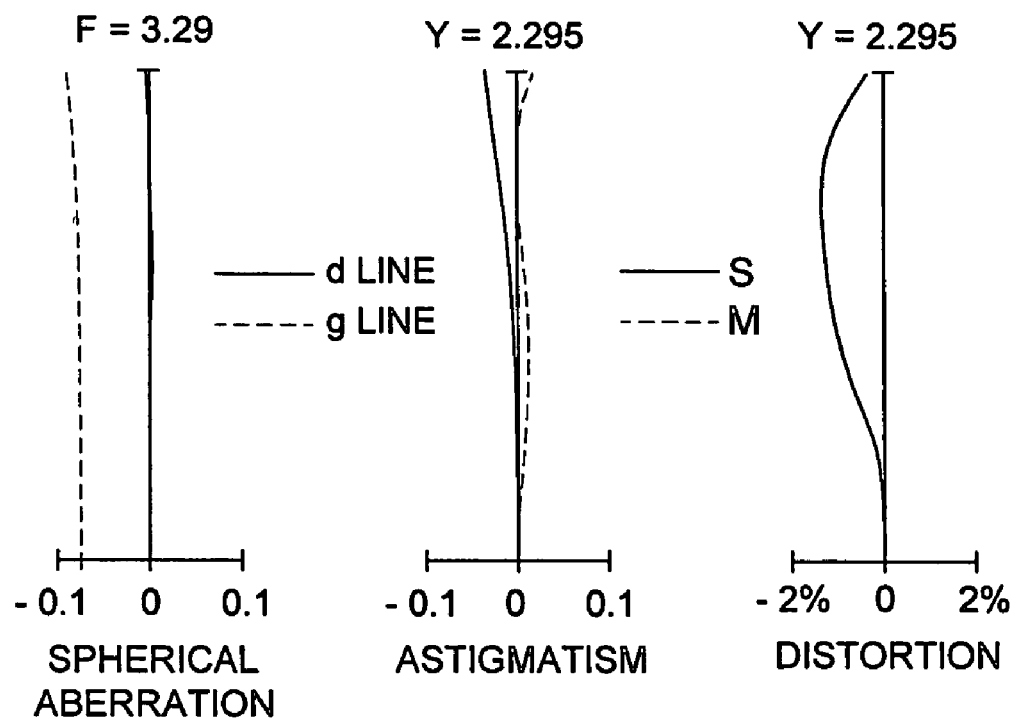
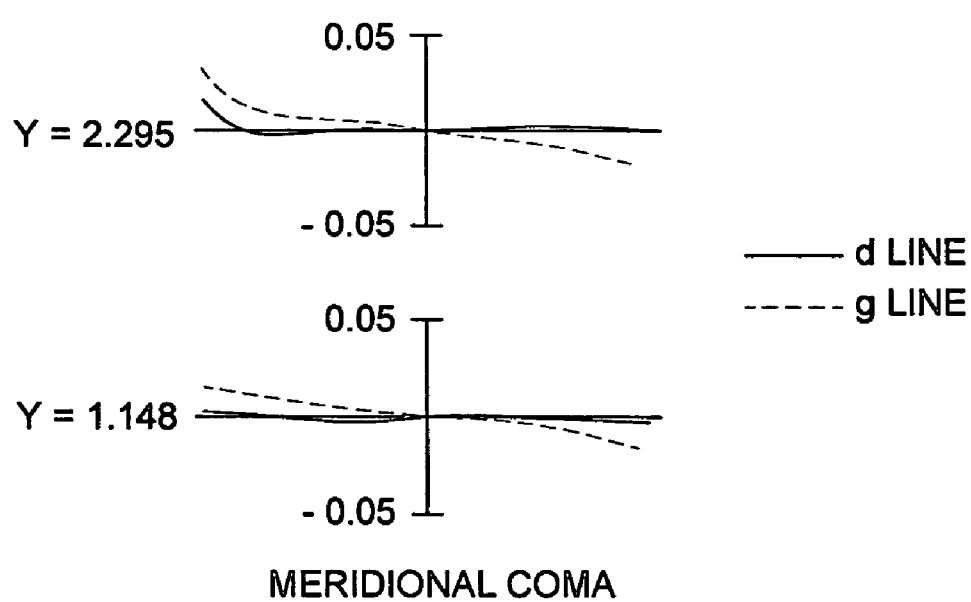

IMAGE PICKUP LENS, IMAGE PICKUP APPARATUS AND MOBILE TERMINAL

This application is based on Japanese Patent Application No. 2005-124843 filed on Apr. 22, 2005 in Japanese Patent Office, the entire content of which is hereby incorporated by reference.

FIELD OF THE INVENTION

The present invention relates to a small-sized image pickup lens, an image pickup unit and a mobile terminal equipped with the image pickup apparatus, which employ a solid-state image pickup element such as a CCD type image sensor or a CMOS type image sensor.

BACKGROUND OF THE INVENTION

In recent years, image pickup apparatuses employing solid-state image pickup elements such as CCD (Charge Coupled Device) type image sensors or CMOS (Complementary Metal Oxide Semiconductor) type image sensors have been downsized, and mobile information terminals such as cell-phones equipped with these information pickup apparatuses have come into wide use.

On the other hand, the image pickup lens to be installed in the image pickup apparatus is not only requested to be further smaller but also is requested increasingly to have higher performance, being affected by the trend of higher number of pixels of the image pickup element.

As an image pickup lens for this application, there is disclosed a three-element image pickup lens wherein a meniscus-shaped positive first lens whose convex surface faces the object side, a meniscus-shaped positive second lens whose convex surface faces the image side and a negative third lens whose concave surface faces the image side are provided in this order from the object side, as one that is capable of having higher performance than that of a one-element or two-element-lens and is not affected by downsizing (for example, see Patent Document 1).

(Patent Document 1) TOKUKAI No. 2003-322792

However, in the image pickup lens described in the Patent Document 1, there is used a meniscus-shaped negative third lens whose convex surface faces the image side. Therefore, a peripheral part of the third lens swells toward the image side. It causes that a position of the lens surface on the optical axis recedes greatly from the image pickup element, when the third lens is arranged not to touch a substrate arranged on the rear side. Thus, a back focus cannot be made small and it leaves room for further improvement in downsizing. Further, aberration correction is not sufficient.

SUMMARY OF THE INVENTION

In view of the aforesaid problems, an object of the invention is to provide a thee-element image pickup lens wherein the total length is further shorter and various aberrations are properly corrected.

To attain the aforesaid object, a structure relating to the invention is an image pickup lens for forming image of a subject on a solid-state image pickup element includes: a first lens having a positive refractive power in a meniscus shape whose convex surface faces to an object side of the image pickup lens; an aperture stop; a second lens having a positive refractive power in a meniscus shape whose convex surface faces to an image side of the image pickup lens; a third lens having a negative refractive power whose concave surface faces to an object side of the image pickup lens. The first lens, the aperture stop, the second lens and the third lens are arranged in this order form an object side of the image pickup lens. The first lens and the third lens satisfy a predefined conditional expression.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIG. 19 is an aberration diagram (spherical aberration, astigmatism, distortion and meridional coma) of the image pickup lens shown in Example 7;

FIG. 21 is an aberration diagram (spherical aberration, astigmatism, distortion and meridional coma) of the image pickup lens shown in Example 8;

FIG. 23 is an aberration diagram (spherical aberration, astigmatism, distortion and meridional coma) of the image pickup lens shown in Example 9.

DETAILED DESCRIPTION OF THE INVENTION

Figure 1:
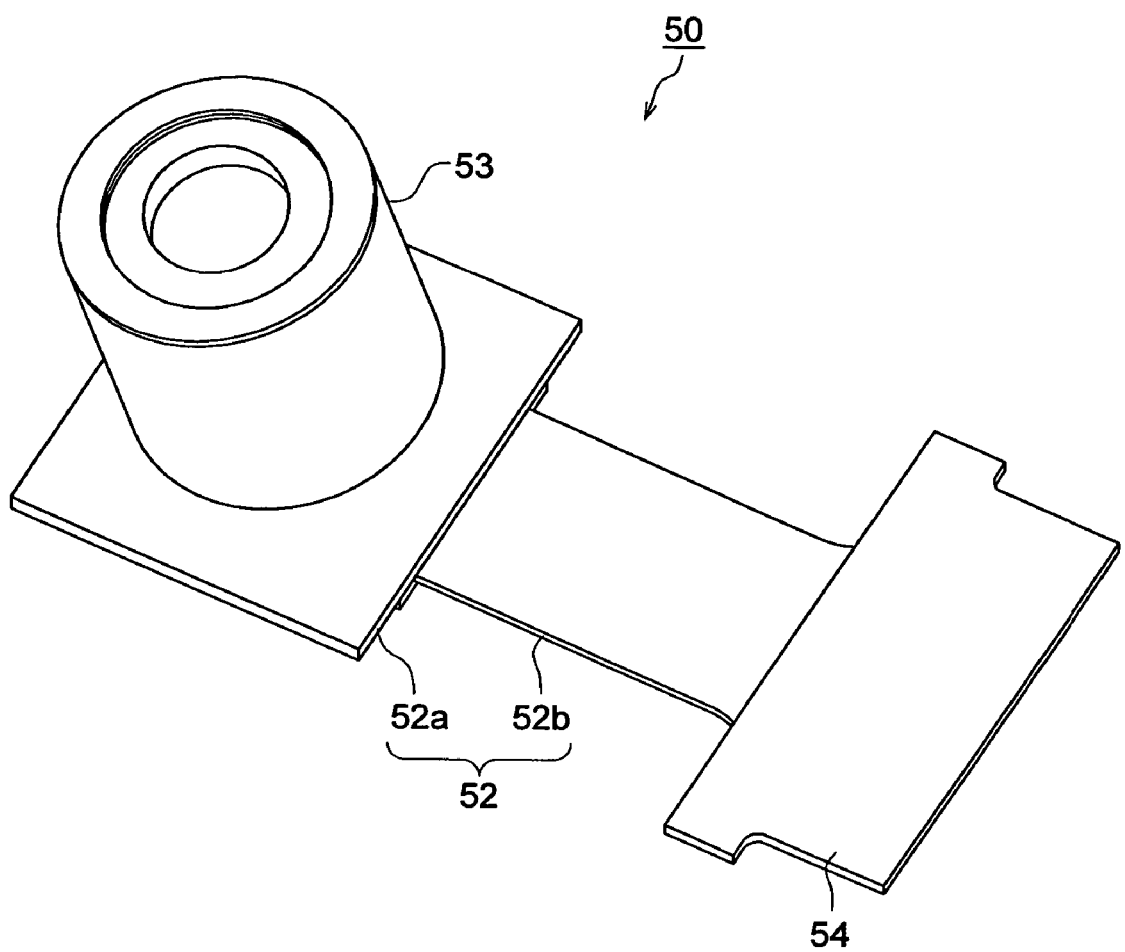
FIG. 1 is a perspective view of an image pickup apparatus relating to the present embodiment.

More specifically, the structure relating to the present invention preferable provides a three-element image pickup lens wherein the following expression is satisfied, the total length of the image pickup lens is short, an outside diameter of the lens can be made small, and downsizing and weight reduction of the whole image pickup apparatus can be attained;

$$L/f<1.30 \quad (6)$$

where, L represents a distance from a lens surface of the total system of image pickup lens closest to the object side to the focus on the image side, and f represents a focal length of the total system of image pickup lens.

Herein, the focus on the image side means an image point resulting in the case where parallel light that is in parallel with an optical axis enters the image pickup lens. Meanwhile, when a parallel flat plate such as an optical lowpass filter, an infrared blocking filter or a seal glass of an image pickup element is arranged between a surface of the image pickup lens closest to the image side and a focus position on the image side, a value of the aforesaid L is to be calculated under the condition that a parallel flat plate portion is made to be an air-conversion distance.

Further, the structure relating to the present invention more preferable satisfies the following conditional expression.

$$L/f<1.20 \quad (6)'$$

The above description is attained by the following structures.

1) An image pickup lens for forming image of a subject on a solid-state image pickup element includes a first lens having a positive refractive power in a meniscus shape whose convex surface faces to an object side of the image pickup lens; an aperture stop; a second lens having a positive refractive power in a meniscus shape whose convex surface faces to an image side of the image pickup lens; a third lens having a negative refractive power whose concave surface faces to the object side of the image pickup lens. The first lens, the aperture stop, the second lens and the third lens are arranged in this order form the object side of the image pickup lens. The image pickup lens satisfies following conditional expressions:

$$0.20<R_1/f<0.40 \quad (1)$$

$$-3.0<(R_5+R_6)/(R_5-R_6)<0, \quad (2)$$

where $R_1$ is a curvature radius of the object side of the first lens, f is a focal length of a total system of the image pickup lens, $R_5$ is a curvature radius of the object side of the third lens, and $R_6$ is a curvature radius of the image side of the third lens.

2) The image pickup lens of Structure 1 satisfies $$0.1<D_{12}/f<0.3 \quad (3)$$

where $D_{12}$ is a distance along an optical axis of an air space between the first lens and the second lens, and f is a focal length of a total system of the image pickup lens.

3) The image pickup lens of Structure 1 or 2 satisfies $$-5.0<P_{air}/P<-1.3, \quad (4)$$

where P is a refractive power of a total system of the image pickup lens, $P_{air}$ is a refractive power of an air lens formed by an image side surface of the first lens and an object side surface of the second lens and is represented by $$P_{air}=(1-n_1)/R_2+(n_2-1)/R_3-\{((1-n_1)\cdot(n_2 1))/(R_2\cdot R_3)\}\cdot D_{12} \quad (5)$$

where $n_1$ is a refractive index of the first lens for d-line, $n_2$ is a refractive index of the second lens for d-line, $R_2$ is a curvature radius of an image side of the first lens, $R_3$ is a curvature radius of an object side of the second lens, and $D_{12}$ is a distance along an optical axis of an air space between the first lens and the second lens.

4) In the image pickup lens of any one of Structures 1–3, each of the first lens, the second lens, and the third lens is formed of a plastic material.

5) An image pickup lens for forming image of a subject on a solid-state image pickup element includes: a first lens having a positive refractive power in a meniscus shape whose convex surface faces to the object side of the image pickup lens; an aperture stop; a second lens having a positive refractive power in a meniscus shape whose convex surface faces to an image side of the image pickup lens; a third lens having a negative refractive power whose concave surface faces to an object side of the image pickup lens. The first lens, the aperture stop, the second lens and the third lens are arranged in this order form the object side of the image pickup lens. The third lens has an object side surface with an aspheric shape such that a position of the object side surface has a smaller negative refractive power as the position is moved from a center to a periphery of the object side surface. The image pickup lens satisfies a following conditional expression:

$$0.20<R_1/f<0.40 \quad (7)$$

where $R_1$ is a curvature radius of the object side of the first lens, and f is a focal length of a total system of the image pickup lens.

6) The image pickup lens of Structure 5, satisfies the following conditional expression:

$$0.1<D_{12}/f<0.3 \quad (8)$$

where $D_{12}$ is a distance of the air space along an optical axis between the first lens and the second lens, and f is a focal length of a total system of the image pickup lens.

7) An image pickup apparatus includes a solid-state image pickup element having a photoelectric converter; an image pickup lens of any one of Structures 1–6 for forming image of a subject to the photoelectric converter of the solid-state image pickup element; a substrate supporting the solid-state image pickup element and having an external connecting terminal for receiving or transmitting electrical signal; and a casing having an opening aperture for entering a light flux from an object side of the image pickup apparatus and comprising a light shielding member. The solid-state image pickup element, the image pickup lens, the substrate, and the casing are formed in one body. A height of the image pickup lens along an optical axis is 10 mm or less.

8) A mobile terminal includes the image pickup apparatus of Structure 7.

In the aforesaid Structure 1), a lens structure is formed as the so-called telephoto type for reducing size of the whole length of the image pickup lens, and positive refracting power is shared by the first lens and the second lens with regard for correcting aberrations, which makes it possible to control occurrence of spherical aberration and coma. Further, an aperture stop is arranged between the first lens and the second lens, and the first lens is in a meniscus form in which a convex surface faces the object side, while, the second lens is in a meniscus form in which a convex surface faces the image side. Therefore, the first lens and the second lens are symmetric in terms of a shape about the stop, and coma caused on the first lens and the second lens can be corrected properly. In addition, in this structure, magnification chromatic aberration and distortion of the total system of the image pickup lens can be corrected easily.

The conditional expression (1) is one to set properly a radius of curvature of the surface of the first lens on the object side, and to attain properly the reduction of the total length of the image pickup lens and correction of aberrations.

Figure 15:
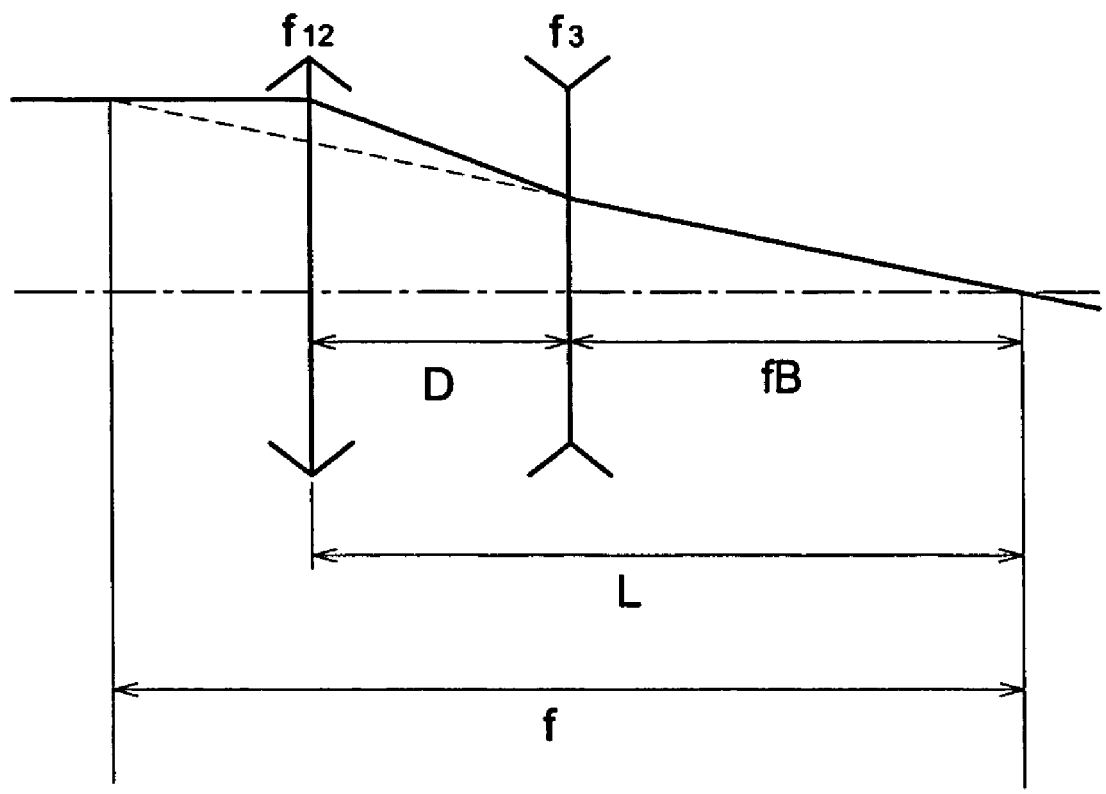
FIG. 15 is a conceptual diagram showing the total length of an image pickup lens.

FIG. 15 is a conceptual diagram showing the total length of the image pickup lens.

Under the assumption that the first lens and the second lens are combined to be a thin positive lens (where, composite focal length is $f_{12}$), the third lens is made to be a thin negative lens (where, its focal length is $f_3$), and they are arranged to be away from each other by distance D to form a lens system, and a back focus is represented by fB, as shown in FIG. 15, the total length L of the lens is given by the following expression.

$$L = fB + D \qquad (9)$$
$$= f(1 - D/f_{12}) + D$$
$$= f - ((f/f_{12}) - 1)D$$

Under the assumption that focal length f of the total system and the composite focal length $f_{12}$ of the first lens and the second lens are constant, the expression (9) shows that the total length of the image pickup lens becomes shorter when the distance D between the third lens and the composite lens including the first lens and the second lens is increased. In other words, it is possible to shorten the total length of the image pickup lens, by arranging the composite principal point of the first and second lenses to be closer to the object side, namely, by setting the refracting power of the surface of the first lens on the object side to be relatively strong.

That is to say, when a value of the conditional expression (1) does not exceed the upper limit, the refracting power of the surface of the first lens on the object side can be maintained properly, the composite principal point of the first and second lenses can be arranged to be closer to the object side, and the total length of the image pickup lens can be shortened. On the other hand, when the lower limit is exceeded, the refracting power of the surface of the first lens on the object side does not become greater than necessary, thus, high order spherical aberration and coma generated on the first lens can be controlled small. It is more preferable that the conditional expression (1) is made to be within the following range.

$$0.23 < R_1/f < 0.38 \qquad (1)'$$

Further, the conditional expression (2) represents conditions for establishing a shape of the third lens properly. In the range shown by the conditional expression (2), the third lens is changed from a meniscus form having negative refracting power wherein a concave surface faces the object side, to a biconcave form wherein refracting power of the surface on the object side is greater than that on the surface on the image side.

Further, as stated above, fB is also required to be shortened for shortening the total length. Therefore, by keeping a value of the conditional expression (2) to be lower than its upper limit, it is possible to properly secure a distance between the most convex portion on the surface of the third lens on the image side and an image pickup surface, while shortening fB. On the other hand, by exceeding the lower limit, it is possible to prevent that the principal point of the third lens moves to be too close to the image side, and to properly keep the height of the on-axis beam that passes through the third lens, which is advantageous for correction of on-axis chromatic aberration. It is more preferable that the conditional expression (2) is in the following range.

$$-2.5 < (R_5 + R_6)/(R_5 - R_6) < -1.0 \qquad (2)'$$

In the range of the conditional expression (2)', the surface of the third lens on the image side is a flat surface or a convex surface whose convex surface faces the image side, and in addition to the aforesaid effect, there is exhibited an effect to suppress the diffusion that is caused even when faint reflected light from an image pickup element is reflected on the surface of the third lens on the image side and to suppress generation of unwanted ghost.

The conditional expression (3) of the aforesaid Structure 2) is a condition to set a distance between the first lens and the second lens properly and thereby to correct properly coma and a field curvature. By keeping a value of the conditional expression (3) to be lower than its upper limit, coma and a field curvature can be corrected properly. Further, since a distance between an aperture stop and the first lens and that between an aperture stop and the second lens are reduced, an outside diameters of the first lens and that of the second lens do not grow larger, which is advantageous for downsizing of the image pickup lens. On the other hand, when the lower limit is exceeded, a space for inserting the aperture stop can be secured sufficiently. It is more preferable that the conditional expression (3) is in the following range.

$$0.12 < D_{12}/f < 0.25 \qquad (3)'$$

The conditional expression (4) of the aforesaid Structure 3) is a condition to make refracting power of an air lens formed by the first lens and the second lens to be appropriate, and thereby to improve correction of an image field and workability of a lens. When the upper limit is not exceeded, negative refracting power by an air lens can be maintained, and thereby, Petzval's sum does not grow too large, thus, the image field can be flattened. On the other hand, when the lower limit is exceeded, negative refracting power by an air lens does not grow too large, thereby, a radius of curvature of the second surface and that of the third surface both interposing the stop can be made large, and workability of the lens is improved. Further, since the second surface and the third surface depart from each other on off-axis basis, an air space for inserting the stop can be secured sufficiently even when the on-axis distance is not increased, resulting in the advantages for downsizing of the image pickup lens. It is more preferable that the conditional expression (4) is in the following range.

$$-3.0 < P_{air}/P < -1.5 \qquad (4)'$$

In recent years, with a purpose of downsizing of the total image pickup apparatus, there has been developed a solid-state image pickup element having the same number of pixels wherein a pixel pitch is small, resulting in a small size of image pickup surface. The image pickup lens for the solid-state image pickup element having the small size of image pickup surface of this kind is required to have a short focal length of the total system. Therefore, a radius of curvature and an outside diameter of each lens need to be extremely small. Accordingly, by constituting the first, second and third lenses in the aforesaid Structure 4) with plastic lenses manufactured by injection molding, it is possible to manufacture at low cost and on a mass production basis, even when a radius of curvature and an outside diameter of the lens are small, compared with glass lenses manufactured by time-consuming grinding and polishing process. In the case of plastic lenses, it is further possible to lower molding temperature and pressing temperature, whereby, abrasion of a molding die can be suppressed, resulting in reduction of frequency for both replacement of molding dies and maintenance, whereby, cost reduction is attained.

Meanwhile, expression "formed by plastic material" in the present invention includes an occasion wherein coating processing for the purpose of antireflection and of improvement of surface hardness is conducted on the surface of plastic material representing a base material. The expression also includes an occasion to mix inorganic microparticles in the plastic material, for the purpose of controlling changes in refractive index of plastic material to be small.

In the aforesaid Structure 5), a lens structure is formed as the so-called telephoto type for reducing size of the whole length of the image pickup lens, and positive refracting power is shared by the first lens and the second lens with regard for correcting aberrations, which makes it possible to control occurrence of spherical aberration and coma. Further, an aperture stop is arranged between the first lens and the second lens, and the first lens is in a meniscus form in which a convex surface faces the object side, while, the second lens is in a meniscus form in which a convex surface faces the image side. Therefore, the first lens and the second lens are symmetric in terms of a shape about the stop, and coma caused on the first lens and the second lens can be corrected properly. In addition, in this structure, magnification chromatic aberration and distortion of the total system of the image pickup lens can be corrected easily.

The conditional expression (7) is one to set properly a radius of curvature of the surface of the first lens on the object side, and to attain properly the reduction of the total length of the image pickup lens and correction of aberrations.

Similar to Structure 1, under the assumption that focal length f of the total system and the composite focal length $f_{12}$ of the first lens and the second lens are constant, the expression (9) shows that the total length of the image pickup lens becomes shorter when the distance D between the third lens and the composite lens including the first lens and the second lens is increased. In other words, it is possible to shorten the total length of the image pickup lens, by arranging the composite principal point of the first and second lenses to be closer to the object side, namely, by setting the refracting power of the surface of the first lens on the object side to be relatively strong.

That is to say, when a value of the conditional expression (7) does not exceed the upper limit, the refracting power of the surface of the first lens on the object side can be maintained properly, the composite principal point of the first and second lenses can be arranged to be closer to the object side, and the total length of the image pickup lens can be shortened. On the other hand, when the lower limit is exceeded, the refracting power of the surface of the first lens on the object side does not become greater than necessary, thus, high order spherical aberration and coma generated on the first lens can be controlled small. It is more preferable that the conditional expression (7) is made to be within the following range.

$$0.23 < R_1/f < 0.38 \qquad (7)'$$

Further, forming an object side surface of the third lens in an aspheric shape such that a position of the object side surface has a smaller negative refractive power as the position is moved from a center to a periphery of the object side surface, restrains a light flux on a periphery from being excessively bent and suppresses an incident angle of the principal ray of the light flux entering to a surrounding area of the image pickup surface of the solid-state image pickup element to be small.

The conditional expression (8) in Structure 6, represents a condition for properly correcting comma or distortion by setting an distance between the first lens and the second lens.

When a value of the conditional expression (8) does not exceed the upper limit, comma or distortion can be properly corrected. Furthermore, external shapes of the first lens and the second lens and it makes advantageous over down sizing of the image pickup lens, because a distance between the aperture stop and the first and second lenses becomes small. On the other hand, when the lower limit is exceeded, a distance for arranging the aperture stop is sufficiently secured.

Moreover, The conditional expression (8) more preferably satisfies the following:

$$0.12 < D_{12}/f < 0.25 \qquad (8)'$$

The aforesaid Structure 7) makes it possible to obtain the image pickup apparatus that is small in size, especially short in terms of the total length in the optical axis, and is capable of coping with high image quality.

"An opening aperture for entering a light flux" in this case includes also a portion where there is formed an area capable of transmitting incident light coming from the object side, in addition to those forming thereon a space such as a hole.

Further, an expression of "a height of an image pickup apparatus in the optical axis direction of an optical pickup lens is 10 mm or less" means the total length of the image pickup apparatus in the optical axis direction, the image pickup apparatus being equipped with a substrate on which a connection terminal for transmitting and receiving of electric signals is formed, an image pickup lens and with a casing made of light-blocking material that houses therein the image pickup lens and has an opening aperture for incidence of light coming from the object side. Therefore, for example, in the occasion where a casing is provided on the surface of the substrate, and electronic parts are mounted on the back of the substrate, the aforesaid expression means that a distance from a tip portion of the casing on the object side to a tip portion of an electronic part protruding on the back surface is 10 mm or less.

The aforesaid Structure 8) makes it possible to obtain a mobile terminal which is small in size and is capable of recording images of high image quality.

That is, the Structure according to the invention makes it possible to obtain a three-element image pickup lens which is small in size and is corrected properly in terms of various aberrations to offer images of high image quality, an image pickup apparatus that is equipped with the aforesaid image pickup lens and a mobile terminal.

While the preferred embodiments of the present invention have been described using specific terms, such description is for illustrative purposes only, and it is to be understood that changes and variations may be made without departing from the sprit or scope of the appended claims.

There will be explained in detail the Structure relating to the invention, referring to embodiments, to which, however, the invention is not limited.

Figure 2:
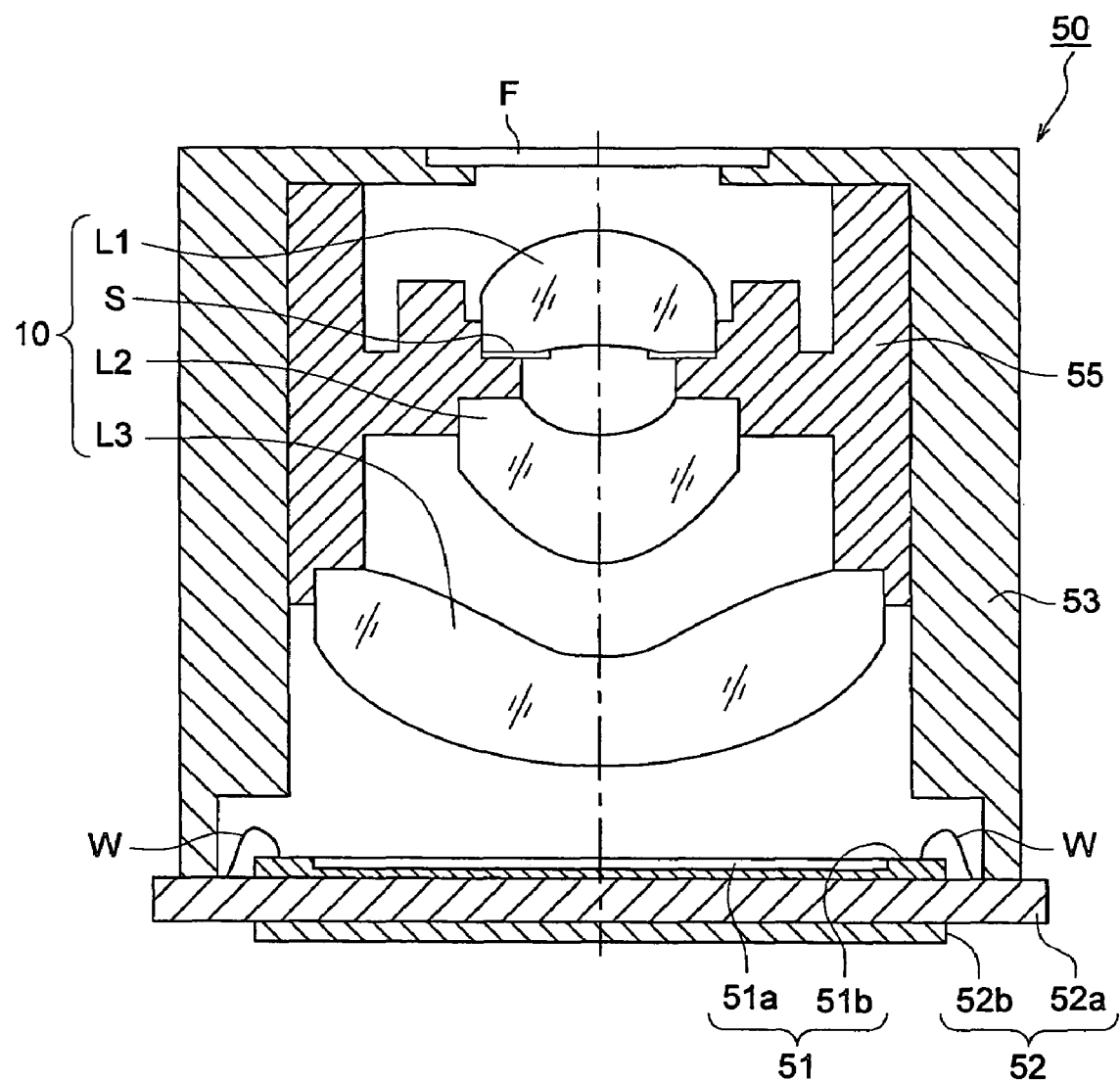
FIG. 2 is a diagram showing schematically a section along an optical axis of an image pickup lens of an image pickup apparatus relating to the present embodiment.

FIG. 1 is a perspective view of image pickup apparatus 50 relating to the present embodiment. FIG. 2 is a diagram showing schematically a section along an optical axis of an image pickup lens of image pickup apparatus 50 relating to the present embodiment.

As shown in FIG. 1 or FIG. 2, the image pickup apparatus 50 is equipped with CMOS type image pickup element 51 representing a solid-state image pickup element having photoelectric conversion section 51a, image pickup lens 10 that forms an image of a subject on the photoelectric conversion section 51a of the image pickup element 51, casing 53 serving as a lens-barrel made of light-shielding member having an opening aperture for incidence of light coming from the object side, supporting substrate 52a that supports the image pickup element 51, and with flexible printed board 52b having external connection terminal (which is also called an external connecting terminal) for transmitting and receiving of electric signals, which are all formed in one body and integrally.

As shown in FIG. 2, photoelectric conversion section 51a serving as a light-receiving section on which pixels (photoelectric conversion elements) are arranged two-dimensionally, is formed at a central portion on the surface of the light-receiving side of the image pickup element 51, and signal processing circuit 51b is formed around the photoelectric conversion section 51a. This signal processing circuit 51b is provided with a drive circuit portion that drives each pixel successively to obtain signal electric charges, A/D converter that converts each signal electric charge into a digital signal and a signal processing section to form image signal output by using the digital signal.

In the vicinity of an outer edge of the surface of the image pickup element 51 on the light-receiving side, there are provided many unillustrated pads which are connected to supporting substrate 52a through bonding wire W. The image pickup element 51 converts signal electric charges coming from the photoelectric conversion section 51a into image signals such as digital YUV signals, and outputs them to prescribed circuit on the supporting substrate 52a through bonding wire W. Y represents luminance signals, U (=R−Y) represents color difference signals between red and luminance signals, and V (=B−Y) represents color difference signals between blue and luminance signals.

Incidentally, the image pickup element is not limited to the aforesaid image pickup element of a CMOS type, and those where other one such as CCD is applied may also be employed.

Substrate 52 is provided with supporting substrate 52a of a hard type supporting on its one side image pickup element 51 and casing 53 and flexible printed board 52b whose one end portion is connected to the other side (the side opposite to the image pickup element 51) of the supporting substrate 52a. On both sides of the supporting substrate 52a, there are provided many signal transmitting pads, and one side thereof is connected with the image pickup element 51 through bonding wire W, while, the other side is connected with the flexible printed board 52b.

One end portion of the flexible printed board 52b is connected with the supporting substrate 52a as shown in FIG. 1, and the supporting substrate 52a is connected with an unillustrated external circuit (for example, a control circuit owned by a higher apparatus in which an image pickup apparatus is installed) through external connection terminal 54 provided on the other end portion, thus, the flexible printed board 52b makes it possible to receive, from an external circuit, the supply of voltage and clock signals for driving the image pickup element 51, and to output digital YUV signals to external circuits. In addition, the flexible printed board 52b has flexibility and its intermediate portion becomes deformed to give degrees of freedom to the direction and arrangement of the external connection terminal 54 for the supporting substrate 52a.

The casing 53 is formed of a member made of light-shielding material (for example, resin containing carbon black), and it is arranged to be fixed on the surface of the supporting substrate 52a on the image pickup element 51 side so that the casing 53 may cover the image pickup element 51. Namely, the casing 53 is opened, on its image pickup element 51 side, to be broad to surround the image pickup element 51 and is fixed on the supporting substrate 52a, while, its other end portion is formed to be a cylinder form with a flange having a small aperture.

On the upper portion of the casing 53, there is fixed infrared blocking filter F. Meanwhile, the infrared blocking filter F may also be fixed between image pickup lens 10 and image pickup element 51.

Image pickup lens 10 is provided with meniscus-shaped first lens L1 having positive refracting power in which a convex surface faces the object side, aperture stop S, meniscus-shaped second lens L2 having positive refracting power in which a convex surface faces the image side, and third lens L3 having negative refracting power in which a concave surface faces the object side, in this order from the object side, so that an image of the object may be formed on photoelectric conversion section 51a of the image pickup element 51. Incidentally, in FIG. 1, the upper side represents the object side, the lower side represents the image side, and a one-dot chain line in FIG. 2 represents an optical axis that is common to respective lenses L1–L3.

Herein, third lens L3 has an object side surface in an aspheric shape such that a position of the object side surface has a smaller negative refractive power as the position is moved from a center to a periphery of the object side surface.

Respective lenses L1–L3 and aperture stop S constituting image pickup lens 10 are held by lens-holder 55. Casing 53 houses this lens-holder 55 and image pickup lens 10 held by the lens-holder 55, while, the outer circumference of the lens-holder 55 engages with the casing 53, and the lens-holder 55 hits the flange portion having a small aperture of the casing 53 to be positioned.

In recent years, with a purpose of downsizing of the total image pickup apparatus, there has been developed a solid-state image pickup element having the same number of pixels wherein a pixel pitch is small, resulting in a small size of image pickup surface. The image pickup lens for the solid-state image pickup element having the small size of image pickup surface of this kind is required to have a relatively short focal length of the total system. Therefore, a radius of curvature and an outside diameter of each lens need to be extremely small. Accordingly, it is preferable, if compared with a glass lens manufactured by time-consuming grinding and polishing process, that each of the first lens L1, the second lens L2 and the third lens L3 is made to be a plastic lens manufactured through injection molding.

When positional fluctuations of the total system of the image pickup lens caused by temperature changes need to be controlled to be small as an image pickup apparatus, it is preferable that the first lens L1 is made to be a glass mold lens.

Further, a fixed stop that intercepts unwanted light may also be arranged ahead of lens L1 or between L2 and L3, though this is not illustrated. In particular, it is possible to suppress occurrence of ghost and flare by arranging a rectangular fixed stop outside a light path.

Figure 3:
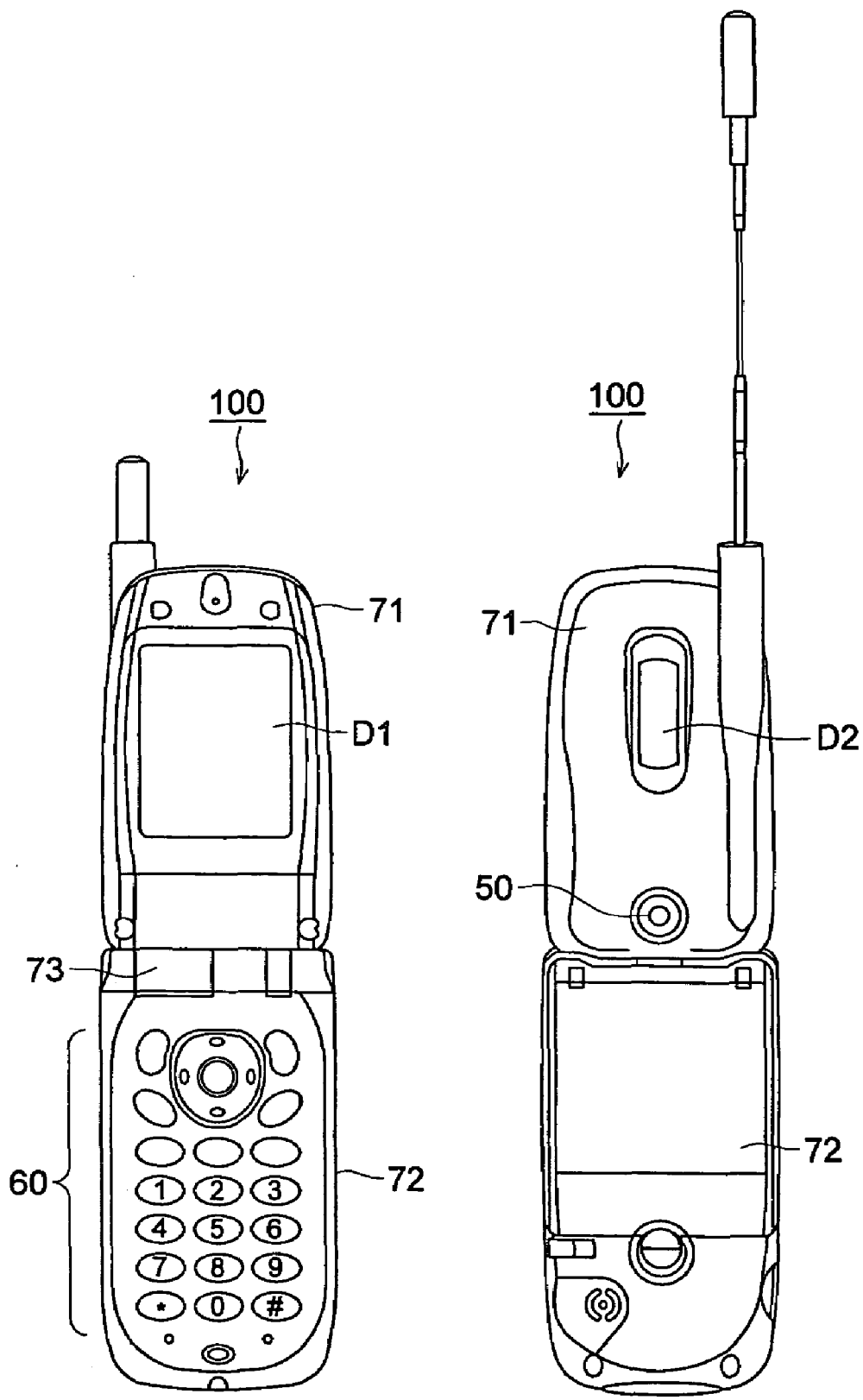
FIG. 3 shown an appearance view of a cell-phone representing an example of a mobile terminal equipped with an image pickup apparatus relating to the present embodiment.

FIG. 3 shows an appearance view of a cell-phone 100 representing an example of a mobile terminal equipped with image pickup apparatus 50 relating to the present embodiment.

In the cell-phone 100 shown in FIG. 3, upper casing 71 representing a case equipped with display screens D1 and D2 and lower casing 72 equipped with operation button 60 which is an input section are connected through hinge 73. The image pickup apparatus 50 is housed under the display screen D2 in the upper casing 71 to be arranged so that the image pickup apparatus 50 may take in light through the outer surface side of the upper casing 71.

Meanwhile, this image pickup apparatus may also be arranged above the display screen D2, or on the side. Further, the cell-phone is not naturally limited to a folding cell-phone.

Figure 4:
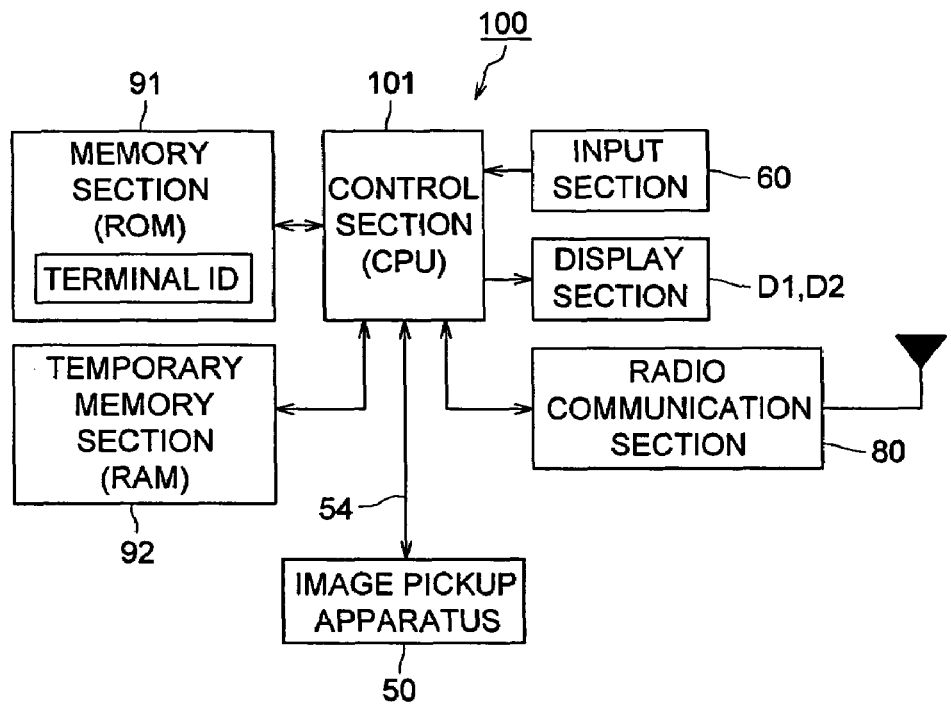
FIG. 4 is a control block diagram of the cell-phone.

FIG. 4 is a control block diagram of cell-phone 100.

As shown in FIG. 4, external connection terminal 54 (illustrated arrow) of the image pickup apparatus 50 is connected with control section 101 of cell-phone 100, and image signals such as luminance signal and color difference signal are outputted to the control section 101.

On the other hand, the cell-phone 100 is equipped with control section (CPU) 101 that carries out a program corresponding to each processing, operation button 60 representing an input portion for specifying and inputting the numbers or the like, display screens D1 and D2 which display prescribed data and images picked up, wireless communication section 80 for realizing various types of communication with external servers, memory section (ROM) 91 that stores various necessary data such as a system program of the cell-phone 100, various processing programs and terminal ID, and temporary memory section (RAM) 92 which stores temporarily various processing programs carried out by control section 101 and data, or processing data and image data by the image pickup apparatus 50.

Further, image signals inputted from the image pickup apparatus 50 are stored in the memory section 91 or displayed on display screens D1 and D2 by the control section 101 of the cell-phone 100, and further are transmitted to the outside as image information through the wireless communication section 80.

EXAMPLES

Examples of the image pickup lens to be applied to the aforesaid embodiment will be shown below. Symbols used for each Example are as follows:

f is a focal length of the total system of image pickup lens;
fB is a back focus;
F is F number;
2Y is a length of diagonal line of image pickup surface of solid-state image pickup element;
R is a Radius of curvature;
D is an on-axis space between planes;
Nd is a refractive index of lens material for d line;
vd is the Abbe's number of lens material.

A form of an aspheric surface in each Example is expressed by the following expression (Numeral 1) under the assumption that an origin is represented by a vertex of the surface, an X-axis is in parallel with an optical axis direction and a height in the direction perpendicular to the optical axis is represented by h;

$$X = \frac{h^2/R}{1+\sqrt{1-(1+K)h^2/R^2}} + \sum A_i h^i \quad \text{(Numeral 1)}$$

wherein $A_i$ represents $i^{th}$ aspheric surface coefficient, R represents a radius of curvature and K represents a conic constant.

Hereafter (including lens data in Tables), the exponent for 10 (for example, $2.5 \times 10^{-02}$) is expressed by using E (for example, 2.5 E−02). Surface numbers for lens data are given in the order wherein a surface of the first lens on the object side comes first as No. 1.

Example 1

Lens data of the image pickup lens in Example 1 are shown in Tables 1 and 2.

TABLE 1

Example 1
f = 3.89 mm    fB = 0.43 mm    F = 3.29    2Y = 4.59 mm

| Surface No. | R (mm) | D (mm) | Nd | vd |
|---|---|---|---|---|
| 1 | 1.171 | 0.89 | 1.53180 | 56.0 |
| 2 | 2.741 | 0.11 | | |
| Aperture stop | ∞ | 0.52 | | |
| 3 | −1.222 | 0.95 | 1.53180 | 56.0 |
| 4 | −0.905 | 0.70 | | |
| 5 | −1.132 | 0.82 | 1.58300 | 30.0 |
| 6 | −4.865 | | | |

TABLE 2

Aspheric surface coefficient

1$^{st}$ surface

K = 1.45880E−01
A4 = 7.61850E−03
A6 = −4.90290E−02
A8 = 9.21730E−02
A10 = 8.99000E−03
A12 = −1.66860E−01
A14 = 1.21880E−01

2$^{nd}$ surface

K = 8.06690E+00
A4 = −1.09590E−03
A6 = 1.57970E−01
A8 = −7.77620E−01
A10 = 1.33310E+00
A12 = −2.06840E−04

3$^{rd}$ surface

K = 8.00130E−01
A4 = −2.13000E−01
A6 = −3.33630E−01
A8 = 6.94690E−01
A10 = −1.14110E+00
A12 = −8.08130E−01

4$^{th}$ surface

K = −2.15810E+00
A4 = −2.29030E−01
A6 = 9.02460E−02
A8 = −4.75200E−02

TABLE 2-continued

Aspheric surface coefficient

A10 = 2.79650E−03
A12 = 2.19470E−02
5th surface

K = −1.26320E+00
A4 = 1.10430E−01
A6 = −1.63950E−02
A8 = 3.74860E−04
A10 = −2.74290E−04
A12 = 7.43650E−05
6th surface K = −4.27020E+01
A4 = −7.66760E−02
A6 = 2.48970E−02
A8 = −4.58910E−03
A10 = 2.61220E−04
A12 = −2.36380E−06

Figure 5:
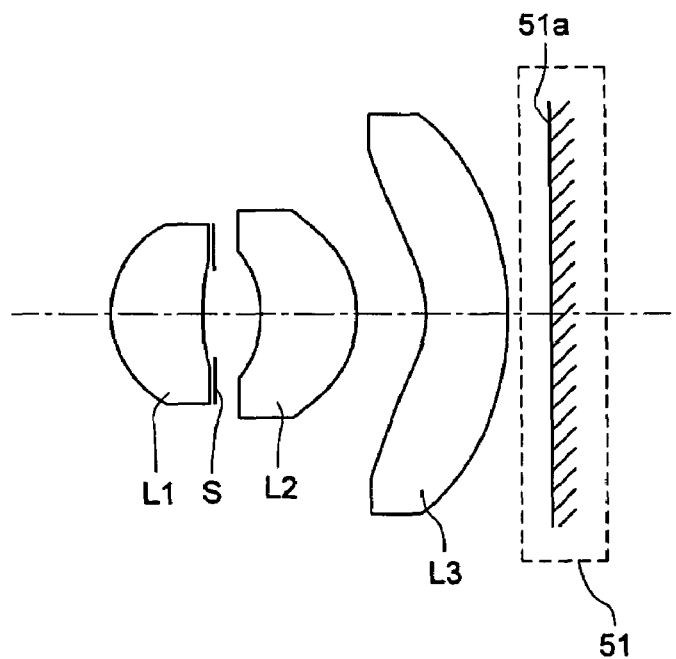
FIG. 5 is a cross-sectional view of the image pickup lens shown in Example 1.

FIG. 5 is a cross-sectional view of the image pickup lens shown in Example 1. In FIG. 5, S represents an aperture stop, L1 represents a first lens, L2 represents a second lens, L3 represents a third lens, 51 represents an image pickup element and 51a represents a photoelectric conversion section serving as a light-receiving section. Meanwhile, the image pickup lens shown in FIG. 5 is one in which an infrared blocking filter is arranged ahead of the image pickup lens, which is omitted in FIG. 5.

Figure 6:
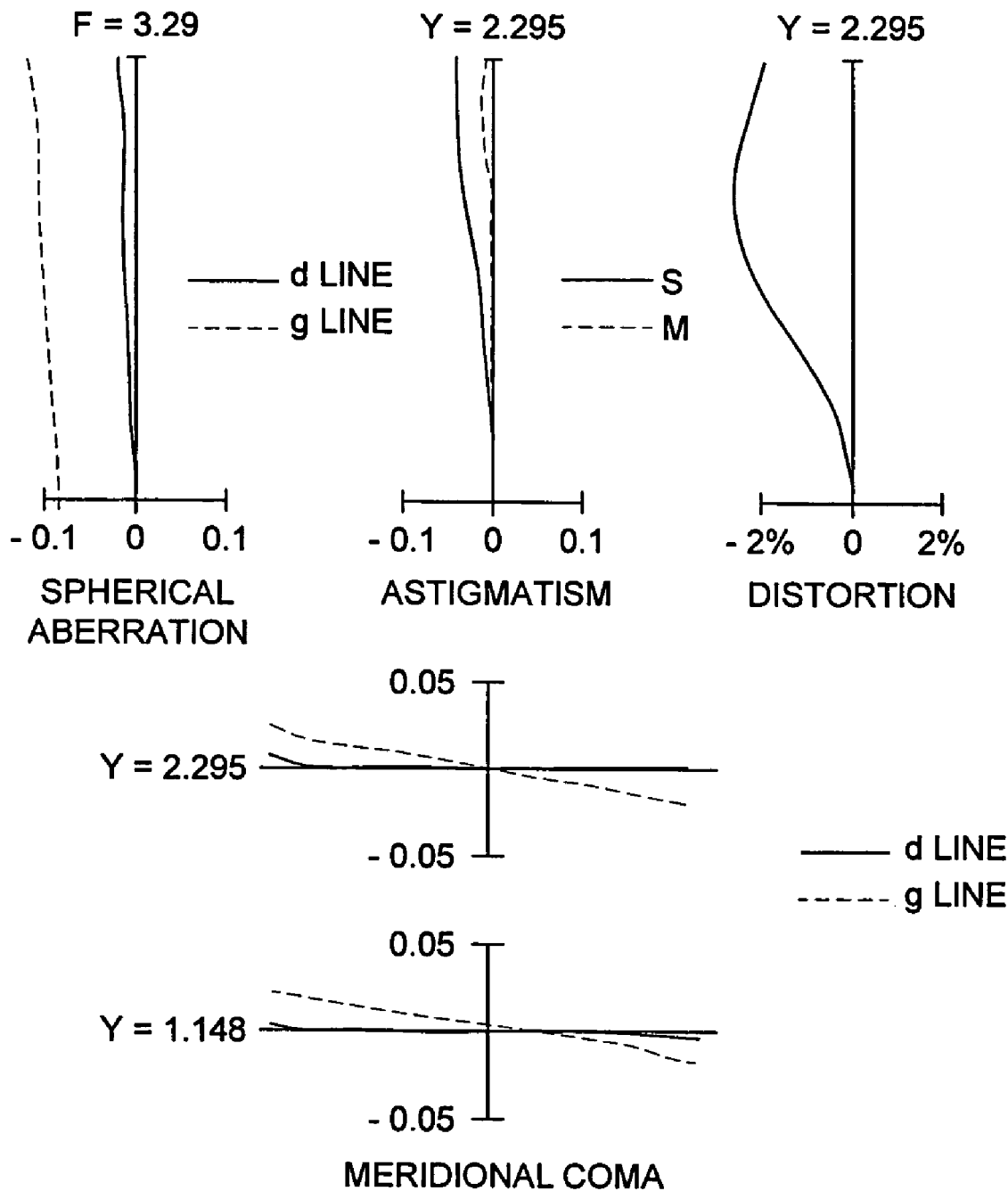
FIG. 6 is an aberration diagram (spherical aberration, astigmatism, distortion and meridional coma) of the image pickup lens shown in Example 1.

FIG. 6 is a diagram of aberrations (spherical aberration, astigmatism, distortion and meridional coma) for the image pickup lens shown in Example 1.

Example 2

Lens data of the image pickup lens in Example 2 are shown in Tables 3 and 4.

TABLE 3

Example 2
f = 3.89 mm    fB = 0.42 mm    F = 3.29    2Y = 4.59 mm

| Surface No. | R (mm) | D (mm) | Nd | vd |
|---|---|---|---|---|
| 1 | 1.174 | 0.89 | 1.53180 | 56.0 |
| 2 | 2.608 | 0.11 | | |
| Aperture stop | ∞ | 0.52 | | |
| 3 | −1.262 | 0.94 | 1.53180 | 56.0 |
| 4 | −0.941 | 0.80 | | |
| 5 | −1.054 | 0.73 | 1.58300 | 30.0 |
| 6 | −2.926 | | | |

TABLE 4

Aspheric surface coefficient

1st surface

K = −4.63370E−02
A4 = 2.02220E−02
A6 = −2.60980E−02
A8 = 8.64300E−02
A10 = 1.16390E−02
A12 = −1.44770E−01
A14 = 1.24550E−01
2nd surface

K = 7.20350E+00
A4 = 1.02810E−02
A6 = 1.59450E−02

TABLE 4-continued

Aspheric surface coefficient

A8 = 1.31620E−01
A10 = −4.59340E−01
A12 = −5.77900E−04
3rd surface

K = 1.57620E+00
A4 = −1.65190E−01
A6 = −2.31680E−01
A8 = 9.25630E−01
A10 = −2.03590E+00
A12 = 8.72630E−01
4th surface K = −2.14350E+00
A4 = −2.20050E−01
A6 = 8.48450E−02
A8 = −4.92200E−02
A10 = 9.86240E−03
A12 = 1.43010E−02
5th surface K = −1.35460E+00
A4 = 1.09800E−01
A6 = −1.59390E−02
A8 = 6.05480E−04
A10 = −1.42350E−04
A12 = 8.49290E−05
A14 = −9.53260E−06
6th surface K = −1.53620E+01
A4 = −6.38740E−02
A6 = 2.36410E−02
A8 = −5.05960E−03
A10 = 3.87730E−04
A12 = 2.30860E−05
A14 = −3.13290E−06

Figure 7:
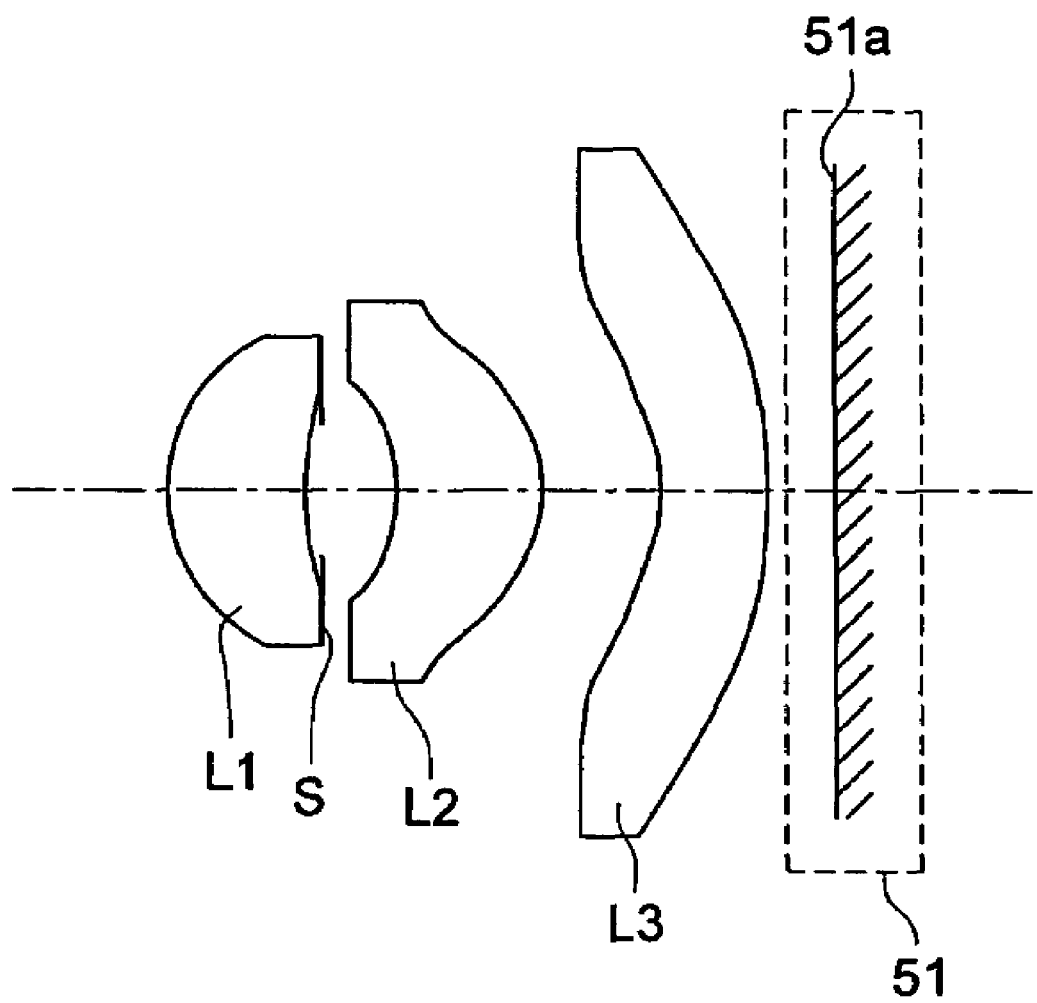
FIG. 7 is a cross-sectional view of the image pickup lens shown in Example 2.

FIG. 7 is a cross-sectional view of the image pickup lens shown in Example 2. In FIG. 7, S represents an aperture stop, L1 represents a first lens, L2 represents a second lens, L3 represents a third lens, 51 represents an image pickup element and 51a represents a photoelectric conversion section serving as a light-receiving section. Meanwhile, the image pickup lens shown in FIG. 5 is one in which an infrared blocking filter is arranged ahead of the image pickup lens, which is omitted in FIG. 7.

Figure 8:
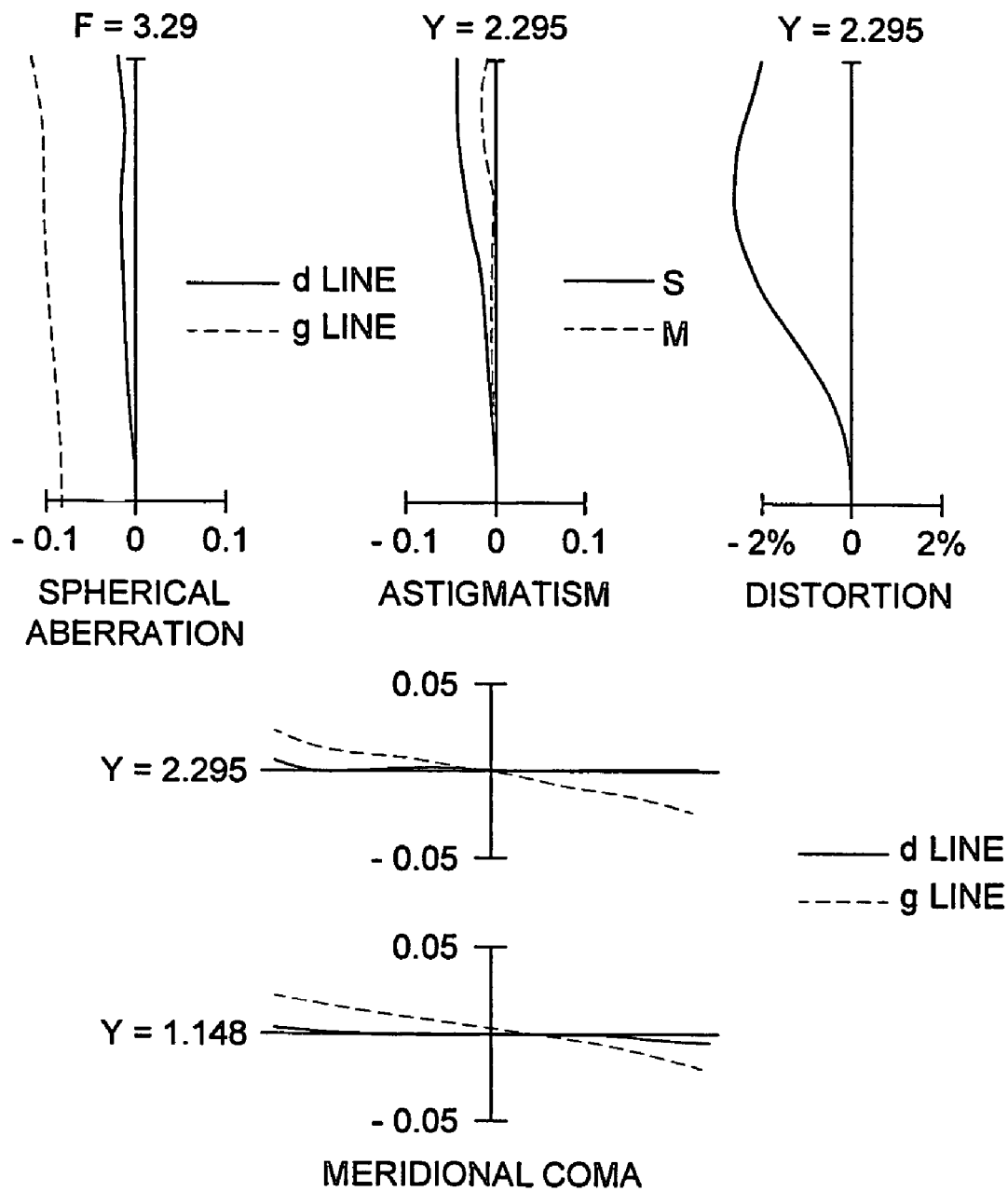
FIG. 8 is an aberration diagram (spherical aberration, astigmatism, distortion and meridional coma) of the image pickup lens shown in Example 2.

FIG. 8 is a diagram of aberrations (spherical aberration, astigmatism, distortion and meridional coma) for the image pickup lens shown in Example 2.

Example 3

Lens data of the image pickup lens in Example 3 are shown in Tables 5 and 6.

TABLE 5

Example 3
f = 3.69 mm    fB = 0.53 mm    F = 3.60    2Y = 4.59 mm

| Surface No. | R (mm) | D (mm) | Nd | vd |
|---|---|---|---|---|
| 1 | 1.086 | 0.90 | 1.53180 | 56.0 |
| 2 | 1.817 | 0.10 | | |
| Aperture stop | ∞ | 0.44 | | |
| 3 | −1.439 | 1.07 | 1.53180 | 56.0 |
| 4 | −0.869 | 0.64 | | |
| 5 | −1.147 | 0.74 | 1.58300 | 30.0 |
| 6 | −4.480 | | | |

TABLE 6

Aspheric surface coefficient

1st surface

K = 3.38740E−01
A4 = −3.67620E−03
A6 = −4.56240E−02
A8 = 4.77340E−02
A10 = 1.72010E−02
A12 = −8.07540E−02

2nd surface

K = 8.94450E+00
A4 = −4.63450E−02
A6 = 5.80140E−01
A8 = −5.27740E+00
A10 = 1.33790E+01

3rd surface

K = 1.29090E−01
A4 = −3.15070E−01
A6 = 3.75540E−01
A8 = −1.73540E+00
A10 = 2.47600E+00

4th surface

K = −2.20850E+00
A4 = −2.62630E−01
A6 = 1.42160E−01
A8 = −9.68810E−02
A10 = 5.96640E−03
A12 = 1.59370E−02

5th surface

K = −1.46450E+00
A4 = 1.03610E−01
A6 = −1.96520E−02
A8 = 3.32910E−03
A10 = −7.24840E−04
A12 = 5.84740E−05

6th surface

K = −5.00000E+01
A4 = −6.38550E−02
A6 = 2.06310E−02
A8 = −4.72470E−03
A10 = 7.24560E−04
A12 = −6.29980E−05

Figure 9:
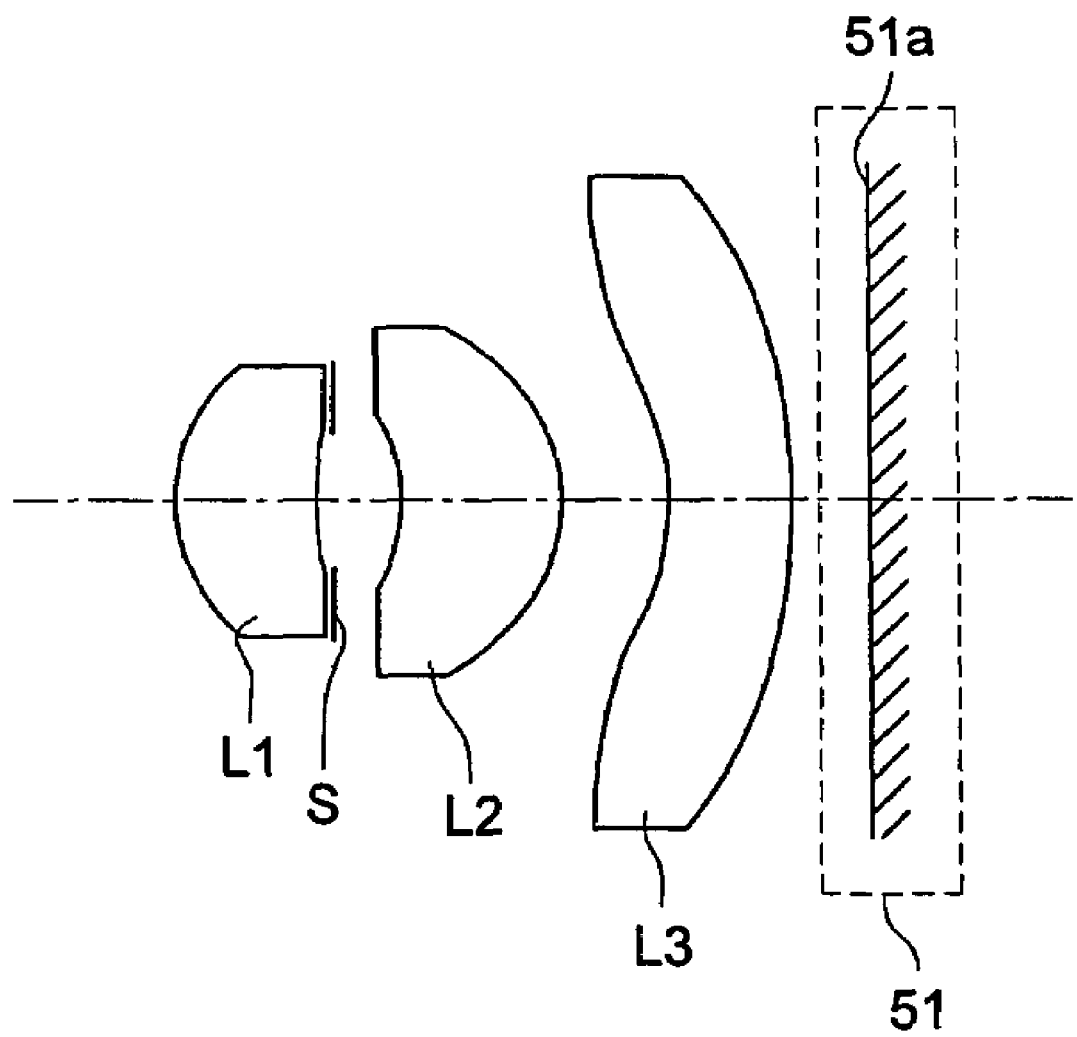
FIG. 9 is a cross-sectional view of the image pickup lens shown in Example 3.

FIG. 9 is a cross-sectional view of the image pickup lens shown in Example 3. In FIG. 9, S represents an aperture stop, L1 represents a first lens, L2 represents a second lens, L3 represents a third lens, 51 represents an image pickup element and 51a represents a photoelectric conversion section serving as a light-receiving section. Meanwhile, the image pickup lens shown in FIG. 9 is one in which an infrared blocking filter is arranged ahead of the image pickup lens, which is omitted in FIG. 9.

Figure 10:
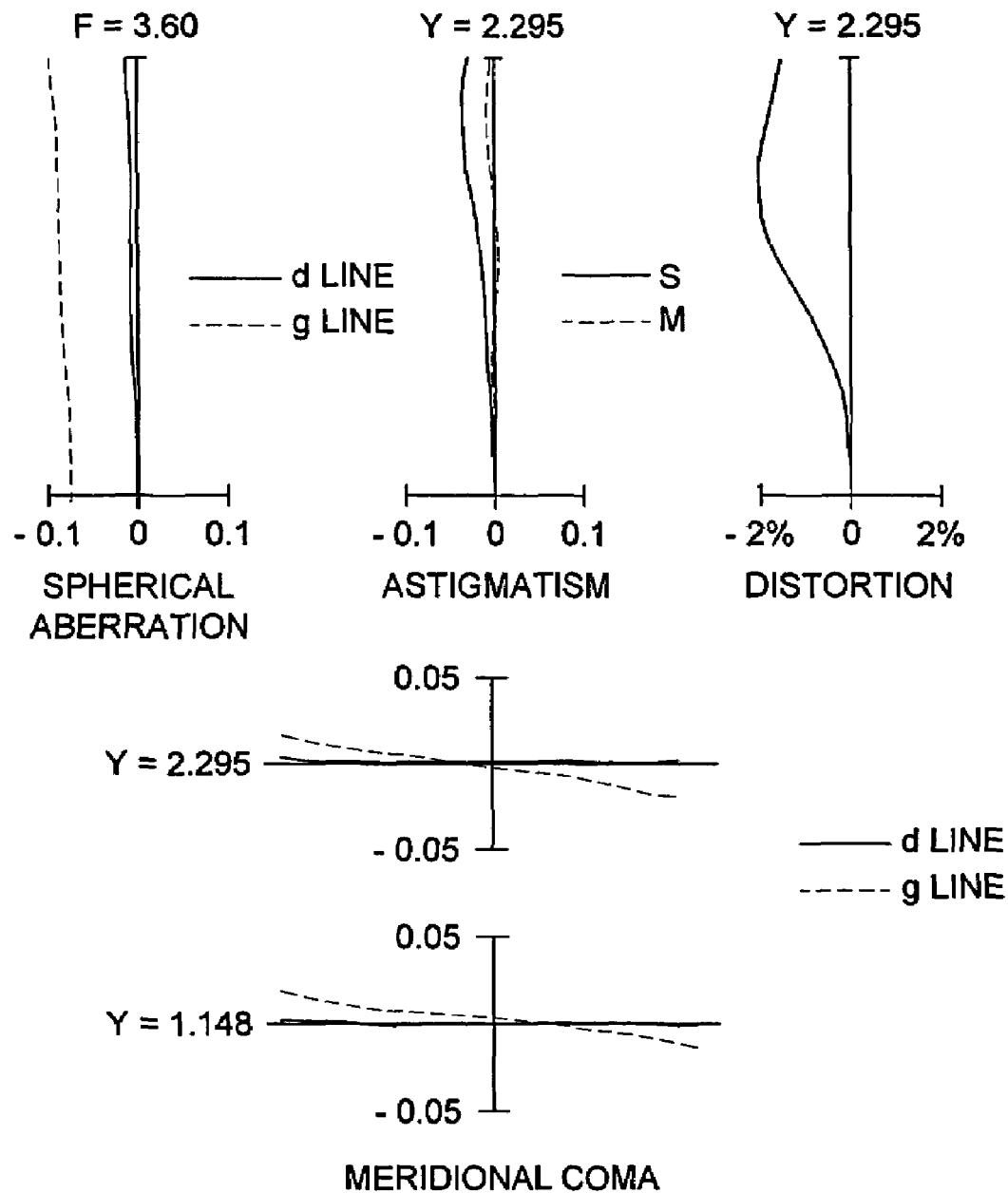
FIG. 10 is an aberration diagram (spherical aberration, astigmatism, distortion and meridional coma) of the image pickup lens shown in Example 3.

FIG. 10 is a diagram of aberrations (spherical aberration, astigmatism, distortion and meridional coma) for the image pickup lens shown in Example 3.

Example 4

Lens data of the image pickup lens in Example 4 are shown in Tables 7 and 8.

TABLE 7

Example 4
f = 3.89 mm    fB = 0.74 mm    F = 3.29    2Y = 4.59 mm

| Surface No. | R (mm) | D (mm) | Nd | νd |
|---|---|---|---|---|
| 1 | 1.341 | 0.84 | 1.53180 | 56.0 |
| 2 | 3.342 | 0.15 | | |
| Aperture stop | ∞ | 0.65 | | |
| 3 | −1.297 | 1.12 | 1.53180 | 56.0 |
| 4 | −0.689 | 0.28 | | |
| 5 | −1.782 | 0.65 | 1.58300 | 30.0 |
| 6 | 2.564 | 0.30 | | |
| 7 | ∞ | 0.09 | 1.74150 | 14.7 |
| 8 | ∞ | | | |

TABLE 8

Aspheric surface coefficient

1st surface

K = 3.92900E−01
A4 = −1.21250E−02
A6 = −7.12890E−03
A8 = −1.07570E−03
A10 = 5.28990E−03
A12 = −1.49400E−02

2nd surface

K = 9.37670E+00
A4 = 4.30350E−04
A6 = −4.74230E−03
A8 = −1.64280E−02
A10 = 6.94890E−03

3rd surface

K = 8.64130E−01
A4 = −1.57470E−01
A6 = −4.57670E−01
A8 = 7.61120E−01
A10 = −9.55720E−01

4th surface

K = −2.67130E+00
A4 = −3.51290E−01
A6 = 3.39090E−01
A8 = −3.56070E−01
A10 = 1.70440E−01
A12 = −2.19610E−02

5th surface

K = −8.31910E+00
A4 = −7.78480E−03
A6 = 1.10340E−02
A8 = 3.35080E−03
A10 = −3.14560E−03
A12 = 7.34780E−04
A14 = −6.44820E−05

6th surface

K = −5.00000E+01
A4 = −9.06140E−02
A6 = 4.37020E−02
A8 = −1.49840E−02
A10 = 3.00120E−03
A12 = −2.84140E−04
A14 = 6.67840E−06

Figure 11:
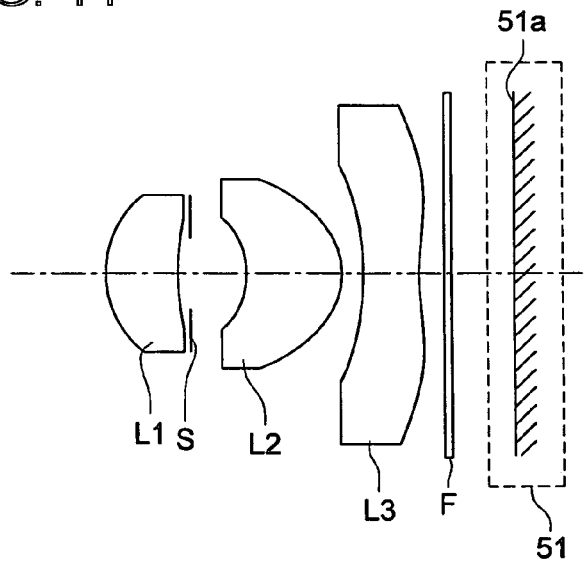
FIG. 11 is a cross-sectional view of the image pickup lens shown in Example 4.

FIG. 11 is a cross-sectional view of the image pickup lens shown in Example 4. In FIG. 11, S represents an aperture stop, L1 represents a first lens, L2 represents a second lens, L3 represents a third lens, 51 represents an image pickup element and 51a represents a photoelectric conversion section serving as a light-receiving section. Further, F represents a parallel flat plate such as an optical lowpass filter, an infrared blocking filter or a seal glass of an image pickup element.

Figure 12:
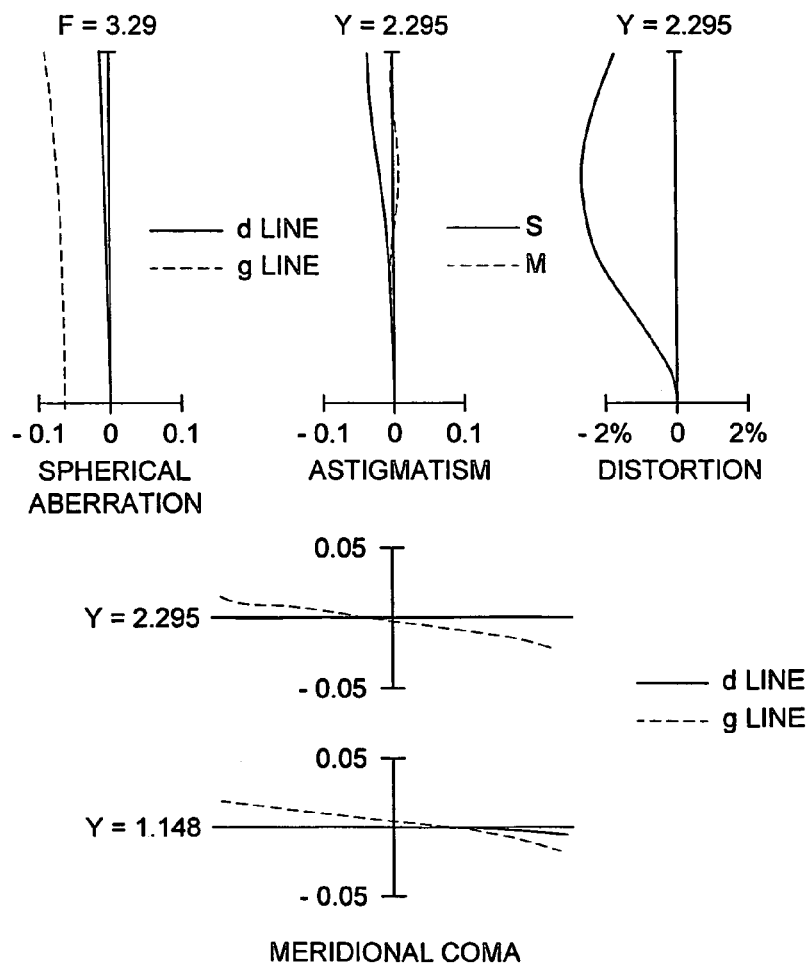
FIG. 12 is an aberration diagram (spherical aberration, astigmatism, distortion and meridional coma) of the image pickup lens shown in Example 4.

FIG. 12 is a diagram of aberrations (spherical aberration, astigmatism, distortion and meridional coma) for the image pickup lens shown in Example 4.

Example 5

Lens data of the image pickup lens in Example 5 are shown in Tables 9 and 10.

TABLE 9

Example 5
f = 3.90 mm   fB = 0.62 mm   F = 3.29   2Y = 4.59 mm

| Surface No. | R (mm) | D (mm) | Nd | νd |
|---|---|---|---|---|
| 1 | 1.459 | 0.78 | 1.49700 | 81.6 |
| 2 | 6.606 | 0.12 | | |
| Aperture stop | ∞ | 0.71 | | |
| 3 | −1.525 | 1.13 | 1.53180 | 56.0 |
| 4 | −0.719 | 0.40 | | |
| 5 | −0.944 | 0.65 | 1.58300 | 30.0 |
| 6 | −63.913 | 0.30 | | |
| 7 | ∞ | 0.09 | 1.74150 | 14.7 |
| 8 | ∞ | | | |

TABLE 10

Aspheric surface coefficient

1$^{st}$ surface

K = 5.41980E−01
A4 = −2.49050E−02
A6 = −1.00930E−02
A8 = 3.57950E−03
A10 = −2.60460E−02
A12 = −1.82220E−03

2$^{nd}$ surface

K = −1.52570E+01
A4 = −1.14600E−02
A6 = 9.67640E−02
A8 = −3.64750E−01
A10 = 3.83490E−01

3$^{rd}$ surface

K = 9.01440E−01
A4 = −2.14240E−01
A6 = −2.09590E−01
A8 = 1.50970E−01
A10 = −1.69760E−01

4$^{th}$ surface

K = −2.63920E+00
A4 = −3.50760E−01
A6 = 3.30930E−01
A8 = −3.40990E−01
A10 = 1.69640E−01
A12 = −2.19080E−02

5$^{th}$ surface

K = −3.70480E+00
A4 = −2.55030E−02
A6 = 6.85970E−03
A8 = 4.95740E−03
A10 = −2.14560E−03
A12 = 4.14310E−04
A14 = −2.71060E−04

6$^{th}$ surface

K = −5.00000E+01
A4 = −7.14780E−02
A6 = 3.27020E−02

TABLE 10-continued

Aspheric surface coefficient

A8 = −1.37800E−02
A10 = 2.99360E−03
A12 = −2.41890E−04
A14 = −1.08470E−05

Figure 13:
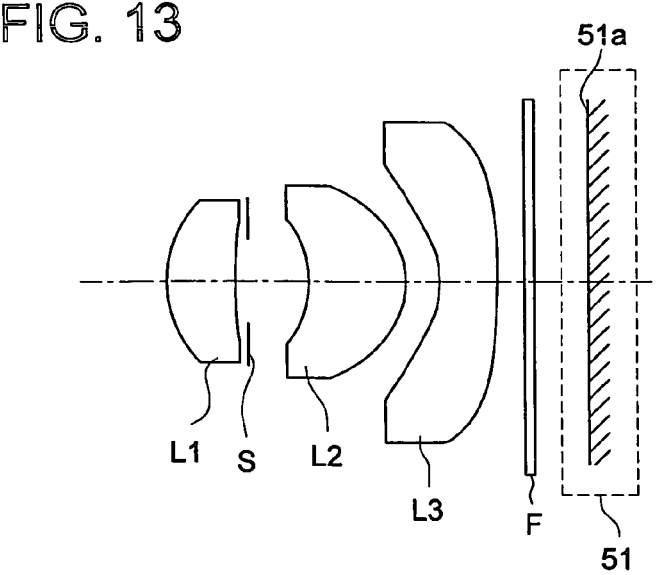
FIG. 13 is a cross-sectional view of the image pickup lens shown in Example 5.

FIG. 13 is a cross-sectional view of the image pickup lens shown in Example 5. In FIG. 13, S represents an aperture stop, L1 represents a first lens, L2 represents a second lens, L3 represents a third lens, 51 represents an image pickup element and 51a represents a photoelectric conversion section serving as a light-receiving section. Further, F represents a parallel flat plate such as an optical lowpass filter, an infrared blocking filter or a seal glass of an image pickup element.

Figure 14:
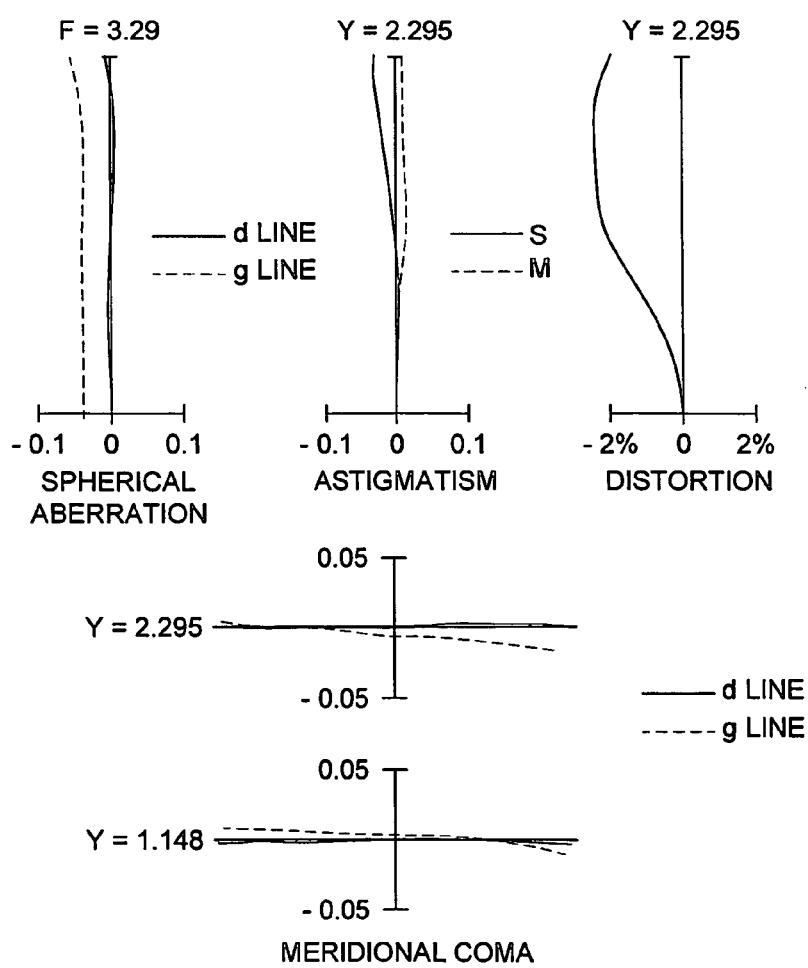
FIG. 14 is an aberration diagram (spherical aberration, astigmatism, distortion and meridional coma) of the image pickup lens shown in Example 5.

FIG. 14 is a diagram of aberrations (spherical aberration, astigmatism, distortion and meridional coma) for the image pickup lens shown in Example 5.

Example 6

Lens data of the image pickup lens in Example 6 are shown in Tables 11 and 12.

TABLE 11

Example 6
f = 4.05 mm   fB = 0.39 mm   F = 3.60   2Y = 4.40 mm

| Surface No. | R(mm) | D(mm) | Nd | νd |
|---|---|---|---|---|
| 1 | 1.014 | 1.11 | 1.48749 | 70.2 |
| 2 | 3.211 | 0.11 | | |
| Aperture stop | ∞ | 0.48 | | |
| 3 | −0.857 | 1.07 | 1.53180 | 56.0 |
| 4 | −1.092 | 0.10 | | |
| 5 | −4.435 | 0.90 | 1.58300 | 30.0 |
| 6 | −299.633 | 0.20 | | |
| 7 | ∞ | 0.09 | 1.74150 | 14.7 |
| 8 | ∞ | | | |

TABLE 12

Aspheric surface coefficient

1$^{st}$ surface

K = −4.06730E−01
A4 = 1.07820E−02
A6 = 6.92270E−02
A8 = −8.08510E−02
A10 = 8.66260E−02
A12 = −3.06900E−02

2$^{nd}$ surface

K = 1.18940E+01
A4 = −7.34710E−02
A6 = −2.14430E−01
A8 = 3.82980E−01
A10 = −2.99680E−01

3$^{rd}$ surface

K = 1.36530E+00
A4 = −2.24840E−01
A6 = 1.87710E−01
A8 = 1.34390E+00
A10 = −1.02630E+01

TABLE 12-continued

Aspheric surface coefficient

4th surface

K = −1.41250E+00
A4 = −3.29600E−02
A6 = −1.95940E−02
A8 = −1.20800E−01
A10 = 1.50820E−01
A12 = −7.38080E−02

5th surface

K = −1.23440E−01
A4 = 7.49590E−02
A6 = −1.99180E−02
A8 = 2.66270E−03
A10 = −1.05080E−04
A12 = 4.08860E−05
A14 = −8.08560E−06

6th surface

K = 5.00000E+01
A4 = −4.27080E−02
A6 = 2.28920E−02
A8 = −6.42650E−03
A10 = 4.49210E−04
A12 = 1.11590E−04
A14 = −1.45620E−05

Figure 16:
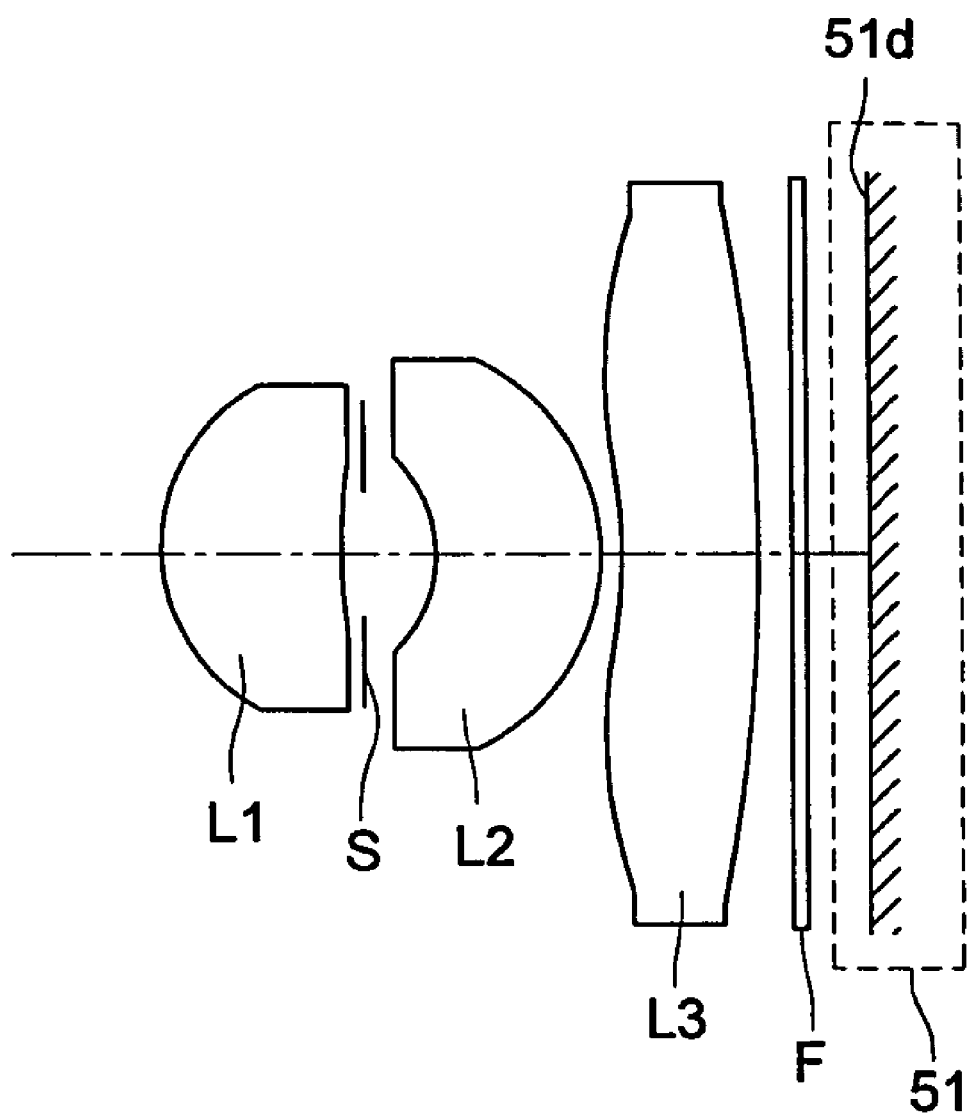
FIG. 16 is a cross-sectional view of the image pickup lens shown in Example 6.

FIG. 16 is a cross-sectional view of the image pickup lens shown in Example 6. In FIG. 16, S represents an aperture stop, L1 represents a first lens, L2 represents a second lens, L3 represents a third lens, 51 represents an image pickup element and 51a represents a photoelectric conversion section serving as a light-receiving section. Further, F represents a parallel flat plate such as an optical lowpass filter, an infrared blocking filter or a seal glass of an image pickup element.

Figure 17:
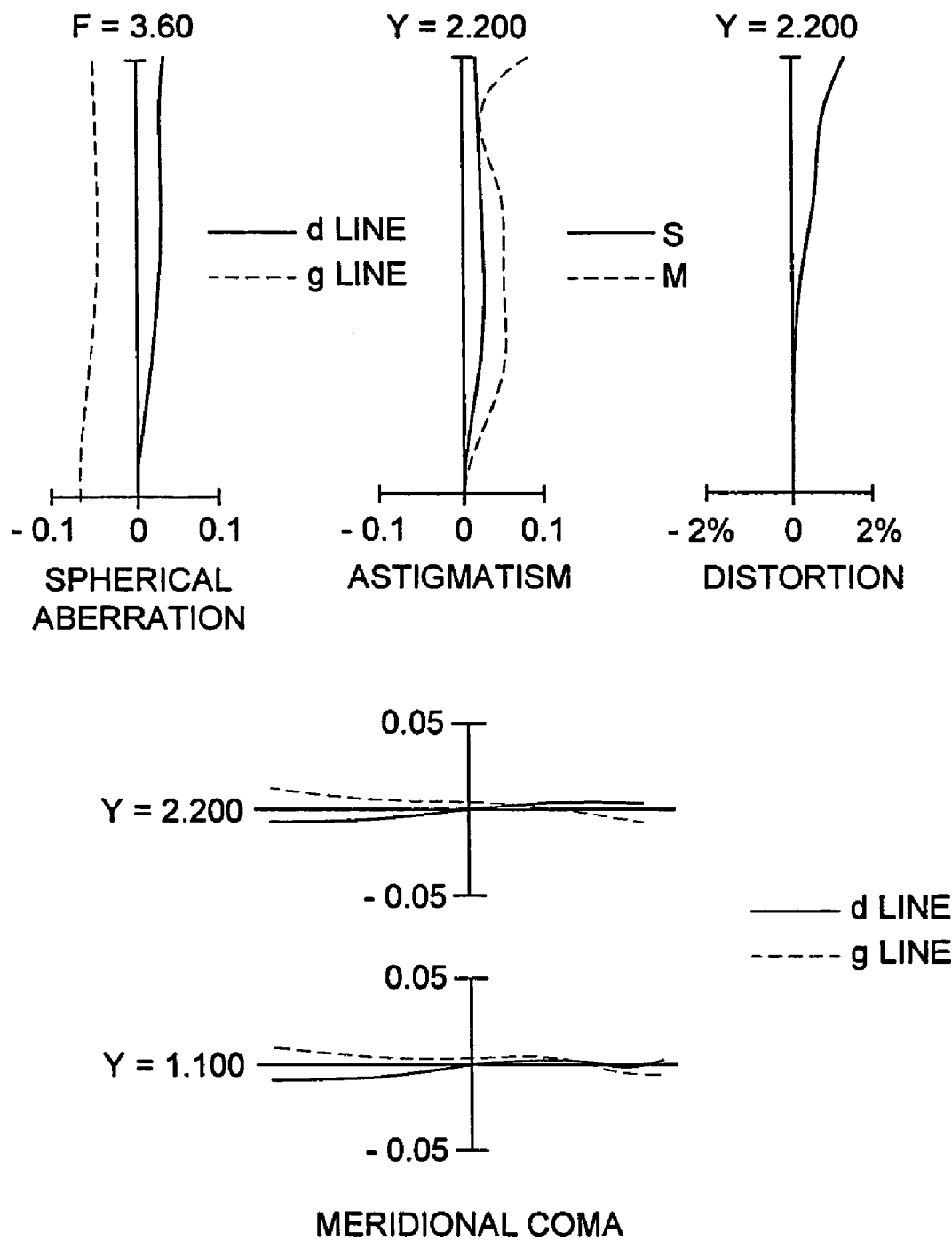
FIG. 17 is an aberration diagram (spherical aberration, astigmatism, distortion and meridional coma) of the image pickup lens shown in Example 6.

FIG. 17 is a diagram of aberrations (spherical aberration, astigmatism, distortion and meridional coma) for the image pickup lens shown in Example 6.

Example 7

Lens data of the image pickup lens in Example 7 are shown in Tables 13 and 14.

TABLE 13

Example 7
f = 3.83 mm fB = 0.55 mm F = 3.60 2Y = 4.40 mm

| Surface No. | R(mm) | D(mm) | Nd | vd |
|---|---|---|---|---|
| 1 | 1.131 | 0.84 | 1.53180 | 56.0 |
| 2 | 2.487 | 0.11 | | |
| Aperture stop | ∞ | 0.47 | | |
| 3 | −1.091 | 0.86 | 1.53180 | 56.0 |
| 4 | −0.862 | 0.43 | | |
| 5 | −2.089 | 0.70 | 1.58300 | 30.0 |
| 6 | 42.471 | 0.40 | | |
| 7 | ∞ | 0.09 | 1.74150 | 14.7 |
| 8 | ∞ | | | |

TABLE 14

Aspheric surface coefficient

1st surface

K = −9.42430E−02
A4 = 1.93810E−02

TABLE 14-continued

Aspheric surface coefficient

A6 = 1.77160E−02
A8 = 1.49340E−02
A10 = 9.64960E−02
A12 = −1.82170E−01
A14 = 1.47950E−01

2nd surface

K = 5.68190E+00
A4 = −2.33590E−02
A6 = 4.20120E−01
A8 = −1.57790E+00
A10 = 1.28340E+00
A12 = 3.54400E+00

3rd surface

K = 1.42100E+00
A4 = −8.81400E−02
A6 = 2.58850E−01
A8 = −4.73830E−01
A10 = −1.25810E+00
A12 = 2.35520E+00

4th surface

K = −1.93170E+00
A4 = −1.37810E−01
A6 = 9.72450E−02
A8 = −5.68710E−02
A10 = 1.09970E−02
A12 = 8.96890E−04

5th surface

K = −1.55580E+00
A4 = 9.82210E−02
A6 = −1.92980E−02
A8 = 2.79870E−04
A10 = 2.34230E−04
A12 = 1.37790E−04
A14 = −4.59240E−05

6th surface

K = −4.99000E+01
A4 = −7.56420E−02
A6 = 2.54340E−02
A8 = −5.64350E−03
A10 = 5.33210E−04
A12 = 8.91260E−05
A14 = −2.35300E−05

Figure 18:
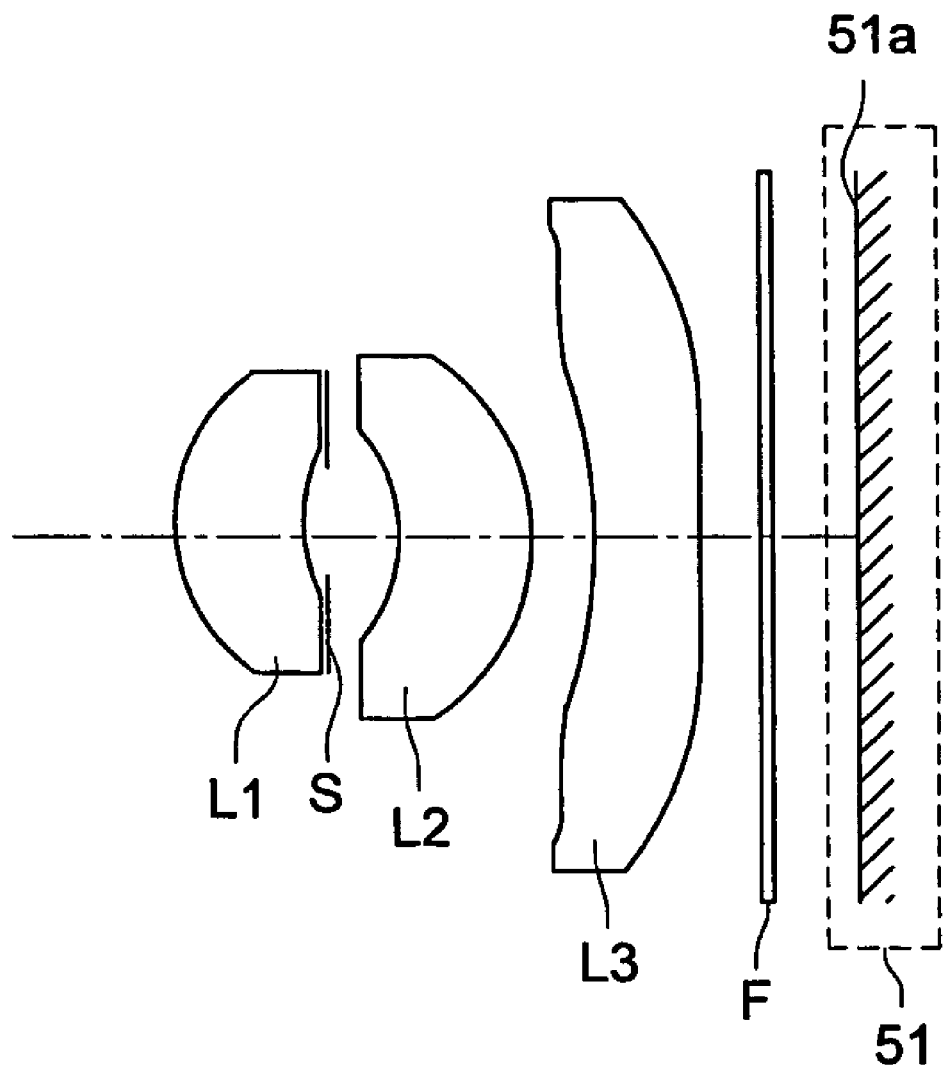
FIG. 18 is a cross-sectional view of the image pickup lens shown in Example 7.

FIG. 18 is a cross-sectional view of the image pickup lens shown in Example 7. In FIG. 18, S represents an aperture stop, L1 represents a first lens, L2 represents a second lens, L3 represents a third lens, 51 represents an image pickup element and 51a represents a photoelectric conversion section serving as a light-receiving section. Further, F represents a parallel flat plate such as an optical lowpass filter, an infrared blocking filter or a seal glass of an image pickup element.

FIG. 19 is a diagram of aberrations (spherical aberration, astigmatism, distortion and meridional coma) for the image pickup lens shown in Example 7.

Example 8

Lens data of the image pickup lens in Example 8 are shown in Tables 15 and 16.

TABLE 15

Example 8
f = 3.86 mm fB = 0.64 mm F = 4.12 2Y = 4.40 mm

| Surface No. | R(mm) | D(mm) | Nd | νd |
|---|---|---|---|---|
| 1 | 1.171 | 0.93 | 1.51633 | 64.1 |
| 2 | 2.479 | 0.18 | | |
| Aperture diaphragm | ∞ | 0.50 | | |
| 3 | −0.722 | 0.55 | 1.53180 | 56.0 |
| 4 | −0.722 | 0.35 | | |
| 5 | −5.839 | 0.89 | 1.58300 | 30.0 |
| 6 | 15.726 | 0.50 | | |
| 7 | ∞ | 0.09 | 1.74150 | 14.7 |
| 8 | ∞ | | | |

TABLE 16

Aspheric surface coefficient

1$^{st}$ surface

K = −1.12970E−01
A4 = 1.83530E−02
A6 = −3.55590E−04
A8 = 9.04230E−03
A10 = 1.05820E−01
A12 = −1.90490E−01
A14 = 1.18530E−01

2$^{nd}$ surface

K = 5.29090E+00
A4 = −2.89480E−02
A6 = 1.50980E−01
A8 = −1.04920E+00
A10 = 3.36000E+00
A12 = −3.12240E+00

3$^{rd}$ surface

K = 3.98470E−01
A4 = −1.60680E−01
A6 = 7.40060E−01
A8 = −7.58130E−01
A10 = −2.91680E+00
A12 = 2.35510E+00

4$^{th}$ surface

K = −1.60530E+00
A4 = −3.01560E−01
A6 = 3.20700E−03
A8 = 1.05850E−04
A10 = −3.42570E−02
A12 = −3.65300E−01

5$^{th}$ surface

K = 5.81340E+00
A4 = 6.54640E−02
A6 = −2.25050E−02
A8 = 5.34110E−04
A10 = 3.13870E−04
A12 = 1.62950E−04
A14 = −3.68640E−05

6$^{th}$ surface

K = 5.00000E+01
A4 = −7.13240E−02
A6 = 2.46130E−02
A8 = −6.71580E−03
A10 = 4.44840E−04
A12 = 8.22890E−05
A14 = −1.37850E−05

Figure 20:
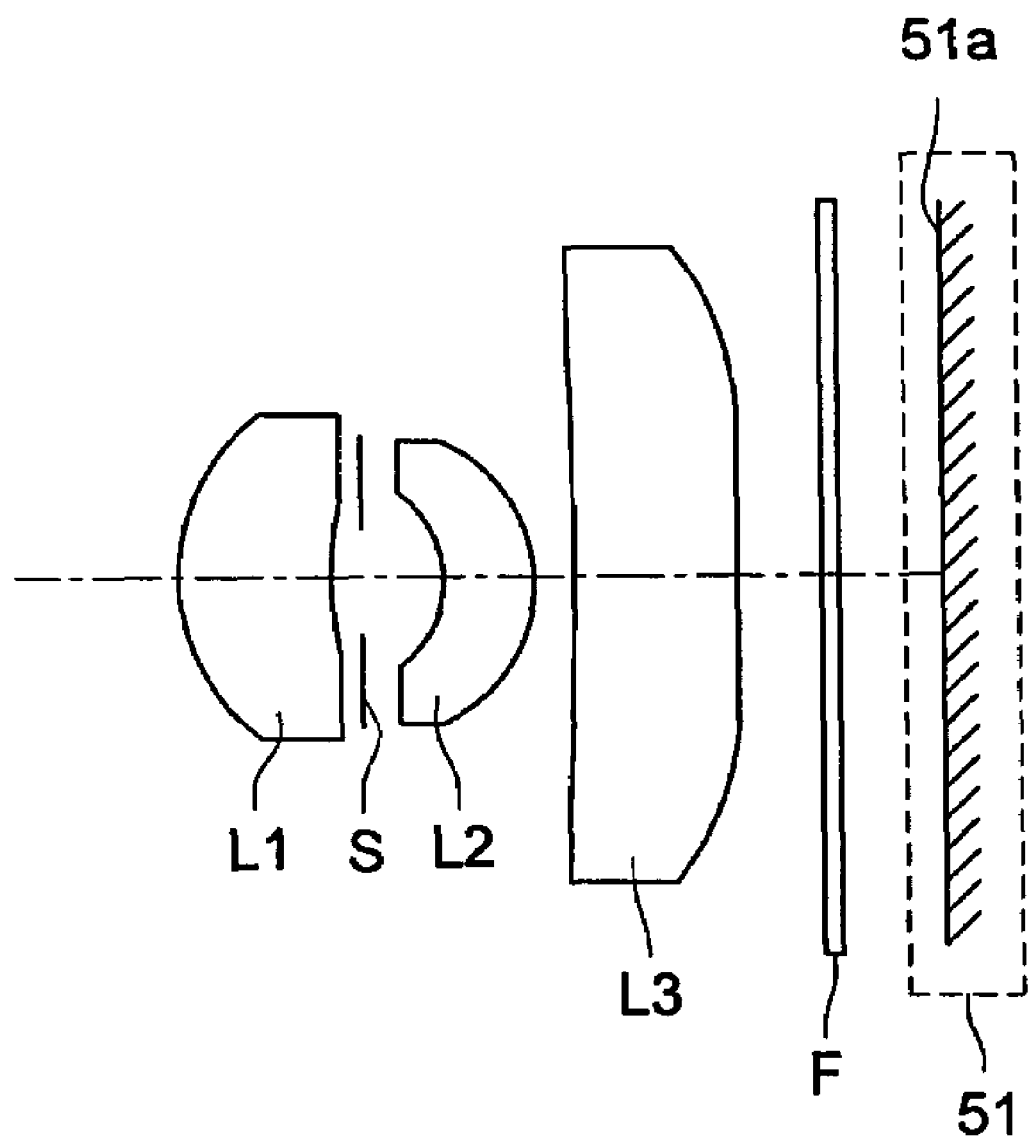
FIG. 20 is a cross-sectional view of the image pickup lens shown in Example 8.

FIG. 20 is a cross-sectional view of the image pickup lens shown in Example 8. In FIG. 20, S represents an aperture stop, L1 represents a first lens, L2 represents a second lens, L3 represents a third lens, 51 represents an image pickup element and 51a represents a photoelectric conversion section serving as a light-receiving section. Further, F represents a parallel flat plate such as an optical lowpass filter, an infrared blocking filter or a seal glass of an image pickup element.

FIG. 21 is a diagram of aberrations (spherical aberration, astigmatism, distortion and meridional coma) for the image pickup lens shown in Example 8.

Example 9

Lens data of the image pickup lens in Example 9 are shown in Tables 17 and 18.

TABLE 17

Example 9
f = 3.84 mm fB = 0.47 mm F = 3.29 2Y = 4.59 mm

| Surface No. | R(mm) | D(mm) | Nd | νd |
|---|---|---|---|---|
| 1 | 1.460 | 0.71 | 1.53180 | 56.0 |
| 2 | 3.472 | 0.10 | | |
| Aperture stop | ∞ | 0.91 | | |
| 3 | −2.360 | 1.03 | 1.53180 | 56.0 |
| 4 | −0.958 | 0.75 | | |
| 5 | −0.842 | 0.70 | 1.58300 | 30.0 |
| 6 | −2.995 | | | |

TABLE 18

Aspheric surface coefficient

1$^{st}$ surface

K = 1.11260E−02
A4 = 1.55270E−02
A6 = 1.39800E−02
A8 = 3.75330E−02
A10 = −1.88700E−02
A12 = −4.48120E−02
A14 = 7.66540E−02

2$^{nd}$ surface

K = 1.23920E+01
A4 = 2.48910E−02
A6 = 1.39280E−02
A8 = 6.60540E−02
A10 = 4.48580E−03
A12 = −6.00700E−04

3$^{rd}$ surface

K = 4.95490E+00
A4 = −1.23920E−01
A6 = −2.76590E−01
A8 = 9.30420E−01
A10 = −1.32050E+00
A12 = 8.15530E−01

4$^{th}$ surface

K = −2.38860E+00
A4 = −2.29140E−01
A6 = 9.47120E−02
A8 = −4.83810E−02
A10 = 2.83310E−03
A12 = 1.14890E−02

5$^{th}$ surface

K = −1.50830E+00
A4 = 1.00170E−01
A6 = −1.51470E−02
A8 = 1.12630E−03
A10 = −1.21930E−04
A12 = 5.93100E−05
A14 = −2.21680E−05

TABLE 18-continued

Aspheric surface coefficient $6^{th}$ surface

K = −1.42230E+01
A4 = −8.74860E−03
A6 = 7.42180E−03
A8 = −3.84670E−03
A10 = 6.12230E−04
A12 = 2.32780E−05
A14 = −1.03560E−05

Figure 22:
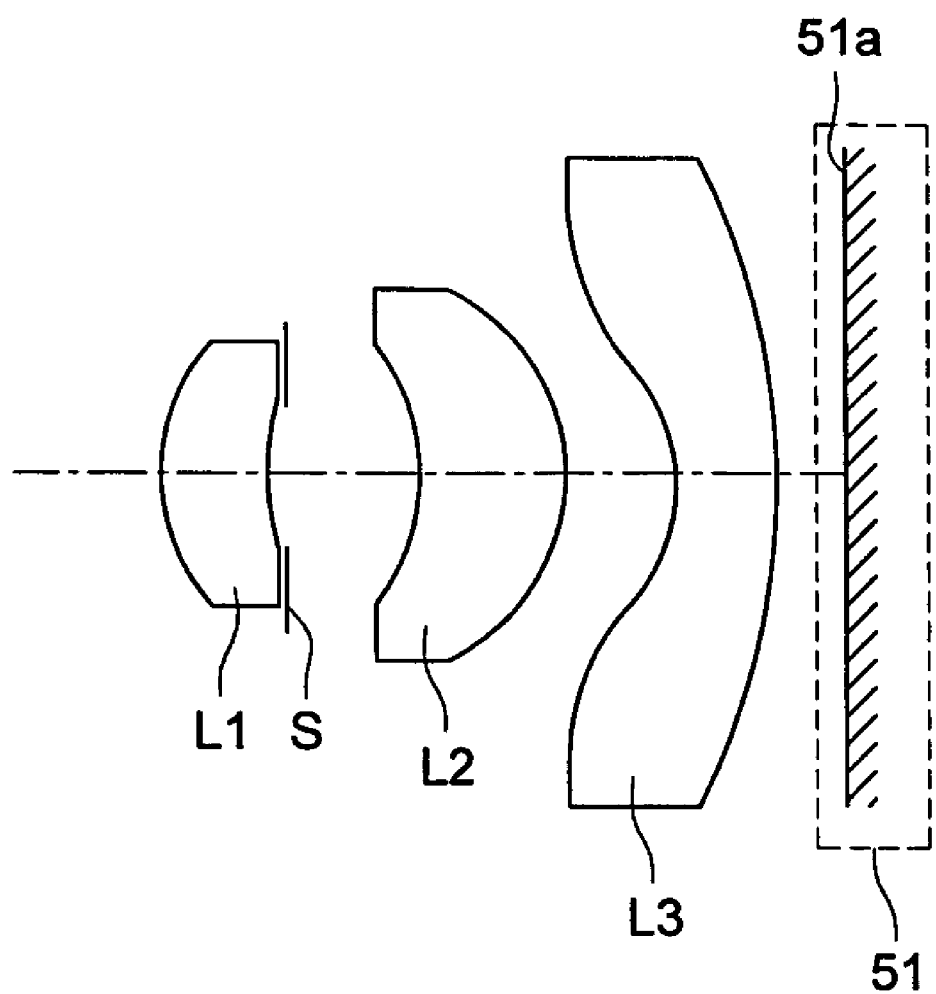
FIG. 22 is a cross-sectional view of the image pickup lens shown in Example 9.

FIG. 22 is a cross-sectional view of the image pickup lens shown in Example 9. In FIG. 22, S represents an aperture stop, L1 represents a first lens, L2 represents a second lens, L3 represents a third lens, 51 represents an image pickup element and 51a represents a photoelectric conversion section serving as a light-receiving section. Further, F represents a parallel flat plate such as an optical lowpass filter, an infrared blocking filter or a seal glass of an image pickup element.

FIG. 23 is a diagram of aberrations (spherical aberration, astigmatism, distortion and meridional coma) for the image pickup lens shown in Example 9.

In the aforesaid Examples 1, 2, 3, 4, 7 and 9, the first lens is made of polyolefin-system plastic material whose saturation water absorption coefficient is 0.01% or less. In the Examples 5, 6 and 8, the first lens is a glass mold lens. In all of the Examples, the second lens is made of polyolefin-system plastic material whose saturation water absorption coefficient is 0.01% or less. In all of the Examples, the third lens is made of polycarbonate-system plastic material whose saturation water absorption coefficient is 0.4%.

Compared with a glass lens, a plastic lens has greater saturation water absorption coefficient, and when it is subjected to rapid temperature changes, uneven distribution of an amount of water absorption is generated transitionally, resulting in a trend that refractive index is not uniform and excellent image forming performance is not obtained. For suppressing performance deterioration caused by temperature changes, it is preferable to use plastic materials each having saturation water absorption coefficient of 0.7% or less.

Further, by making the first lens to be a glass mold lens, it is possible to use a material that is lower than a plastic material in terms of dispersion, which is effective for reduction of on-axis chromatic aberration.

Table 19 shows values corresponding to respective conditional expressions in the aforesaid Examples 1–9.

Since the refractive index of a plastic material is changed greatly by temperature changes, when all of the first, second and third lenses are composed of plastic lenses, a focus position of the total system of the image pickup lens is fluctuated by changes of ambient temperatures, which is a problem. In the image pickup unit with specifications in which this fluctuation of focus position cannot be ignored, it is possible to lighten this problem of temperature characteristics, by making the positive first lens to be a lens made of glass material (for example, glass mold lens), for example, then, by making each of the positive second lens and negative third lens to be a plastic lens, and by allocating refracting power to each of the second and third lenses in a way that fluctuations of focus position caused by temperature changes are canceled each other. When using a glass mold lens, it is preferable to use glass material having a glass transition point (Tg) of 400° C. or less, for preventing abrasion of a molding die.

In recent years, it has been found that changes in plastic material by temperature can be made small by mixing inorganic microparticles in plastic material. In detailed description, when microparticles are mixed in transparent plastic material, scattering of light is caused in general, to lower the transmittance, whereby, it has been difficult to use the plastic material as an optical material. However, it is possible to prevent scattering substantially, by making a size of a microparticle to be smaller than a wavelength of a transmitted light flux. Though the refractive index of the plastic material is lowered when the temperature of the plastic material is raised, the refractive index of the inorganic particle is enhanced when the temperature of the inorganic particle is raised. Therefore, it is possible to make occurrence of scattering to be zero substantially, by making the plastic material and the inorganic particle to cancel each other in terms of refractive index, by utilizing their temperature-dependencies. Specifically, when inorganic particles each being 20 nanometers or less in terms of the maximum length are dispersed in plastic material representing a base material, the temperature-dependency for refractive index of the plastic material becomes extremely low. For example, changes of refractive index caused by temperature changes can be made small by dispersing microparticles of niobium oxide ($Nb_2O_5$) in acryl. In the present invention, by using plastic material in which the inorganic particles of this kind are dispersed, for one of two positive lenses (L1 and L2) or for all lenses (L1, L2 and L3), positional fluctuations of image point for the total system of the image pickup lens caused by temperature changes can be suppressed small.

Now, changes of refractive index caused by temperature changes will be explained in detail. Change of refractive index caused by temperature change A is expressed by the

TABLE 19

| Conditional expressions | Example 1 | Example 2 | Example 3 | Example 4 | Example 5 | Example 6 | Example 7 | Example 8 | Example 9 |
|---|---|---|---|---|---|---|---|---|---|
| (1) (7) $R_1/f$ | 0.30 | 0.30 | 0.29 | 0.35 | 0.37 | 0.25 | 0.30 | 0.30 | 0.38 |
| (2) $(R_5 + R_6)/(R_5 - R_6)$ | −1.61 | −2.13 | −1.69 | −0.18 | −1.03 | −1.03 | −0.91 | −0.46 | −1.78 |
| (3) (8) $D_{12}/f$ | 0.16 | 0.16 | 0.15 | 0.21 | 0.21 | 0.15 | 0.15 | 0.18 | 0.26 |
| (4) $P_{air}/P$ | −2.65 | −2.64 | −2.66 | −2.42 | −1.77 | −3.36 | −2.92 | −4.05 | −1.59 |
| (6) L/f | 1.14 | 1.14 | 1.20 | 1.23 | 1.22 | 1.09 | 1.15 | 1.19 | 1.22 | following (Numeral 2) by differentiating refractive index n with temperature t, based on Lorentz-Lorenz equation;

$$A = \frac{(n^2+2)(n^2-1)}{6n}\left\{(-3\alpha) + \frac{1}{[R]}\frac{\partial[R]}{\partial t}\right\}$$ (Numeral 2)

wherein, α represents the coefficient of linear expansion, and [R] represents the molecular refraction.

In the case of plastic materials, contribution of the second term is generally smaller than that of the first term in the expression, and it can be ignored substantially. For example, in the case of PMMA resin, for example, the coefficient of linear expansion α is $7\times10^{-5}$, and when this is substituted in the aforesaid expression, the value of A is $-1.2\times10^{-4}$ (/° C.) which agrees with an actual measurement value on the whole.

Specifically, it is preferable that change of refractive index caused by temperature change A which has been about $-1.2\times10^{-4}$ (/° C.) is controlled to be less than $8\times10^{-5}$ (/° C.) in an absolute value. Preferably, it is controlled to be less than $6\times10^{-5}$ (/° C.) in an absolute value.

Table 20 shows change of refractive index caused by temperature change A (dn/dT) of plastic material which can be applied to the invention.

TABLE 20

| Plastic material | A (approximate value) ($10^{-5}$/° C.) |
|---|---|
| Polyolefin-system | −11 |
| Polycarbonate-system | −14 |

Now, referring to an example of the image pickup lens in Example 1, there is shown a difference in an amount of change of back focus caused by temperature changes between an occasion of using a plastic lens in which the aforesaid microparticles are dispersed and an occasion of using no plastic lens in which the aforesaid microparticles are dispersed.

First, amount of change of back focus (ΔfB) for the temperature rise of +30° C. above a normal temperature 20° C. in the case where the plastic lens in which the aforesaid microparticles are dispersed is not used at all for the image pickup lens in Example 1 is +0.026 mm, while, amount of change of back focus (ΔfB) for the temperature fall of −30° C. is −0.026 mm.

Next, Table 21 shows changes of refractive index Nd caused by temperature changes in the occasion where the plastic material in which the microparticles are dispersed is used for each of the first lens and the second lens, and the third lens is made to be a plastic lens in which the microparticles are not contained.

TABLE 21

| | A(/° C.) | Refractive index Nd at a normal temperature | Refractive index Nd at a normal temperature +30° C. | Refractive index Nd at a normal temperature −30° C. |
|---|---|---|---|---|
| 1st lens | $-8\times10^{-5}$ | 1.5318 | 1.5294 | 1.5342 |
| | $-6\times10^{-5}$ | | 1.5300 | 1.5336 |
| 2nd lens | $-8\times10^{-5}$ | 1.5318 | 1.5294 | 1.5342 |
| | $-6\times10^{-5}$ | | 1.5300 | 1.5336 |
| 3rd lens | $-14\times10^{-5}$ | 1.5830 | 1.5788 | 1.5872 |

According to the foregoing, amount of change of back focus (ΔfB) for the temperature rise of +30° C. above a normal temperature (20° C.) is +0.018 mm when each of the first lens and the second lens has A $=-8\times10^{-5}$ (/° C.), and it is +0.012 mm when each of the first lens and the second lens has A $=-6\times10^{-5}$ (/° C.), while, amount of change of back focus (ΔfB) for the temperature fall of −30° C. is −0.018 mm when each of the first lens and the second lens has A $=-8\times10^{-5}$ (/° C.), and it is −0.012 mm when each of the first lens and the second lens has A $=-6\times10^{-5}$ (/° C.).

The foregoing indicates that amount of change of back focus (ΔfB) caused by temperature changes is controlled to be a half or less when each of the first lens and the second lens employs plastic material in which the microparticles are dispersed, and has A $=-6\times10^{-5}$ (/° C.), compared with an occasion where the aforesaid microparticles are not contained at all.

Further, each of the first, second and third lenses may employ its own plastic material in which the microparticles having a different value of refractive index caused by temperature changes are dispersed, and in that case, it is possible to prevent completely occurrence of positional fluctuations of the total system of the image pickup lens caused by temperature changes, by considering an extent of contribution to positional fluctuations of an image point of each lens caused by temperature changes, and by selecting an optimum value of A.

The aforesaid Example 5 is an example wherein the positive first lens is made to be a glass mold lens, each of positive second lens and negative third lens is made to be a plastic lens, and refracting power of the second lens and that of the third lens are allocated so that positional fluctuations of image point caused by temperature changes may be canceled each other to a certain extent between the second lens and the third lens. Amount of change of back focus (ΔfB) for the temperature rise of +30° C. above a normal temperature (20° C.) in Example 5 is −0.001 mm, and amount of change of back focus (ΔfB) for the temperature fall of −30° C. is +0.001 mm.

Incidentally, with respect to the principal ray incidence angle of a light flux entering an imaging area of a solid-state image pickup element in the present example, it is not always designed to be sufficiently small on the peripheral part of the imaging area. However, in the recent technology, it has become possible to lighten the shading by reviewing arrangement of color filters of solid-state image pickup element and on-chip micro-lens array. Specifically, if a pitch of the arrangement of color filters and on-chip micro-lens array is set to be slightly small for a pixel pitch of the imaging area of the image pickup element, a light flux entering obliquely can be guided effectively to the light-receiving portion of each pixel, because a color filter and on-chip micro-lens array are shifted toward the optical axis of the image pickup lens for each pixel, as a position of light approaches a peripheral part of the imaging area. Owing to this, the shading caused on the solid-state image pickup element can be controlled to be small.

What is claimed is:

1. An image pickup lens for forming image of a subject on a solid-state image pickup element comprising:
   a first lens having a positive refractive power in a meniscus shape whose convex surface faces to an object side of the image pickup lens;
   an aperture stop;
   a second lens having a positive refractive power in a meniscus shape whose convex surface faces to an image side of the image pickup lens;

a third lens having a negative refractive power whose concave surface faces to an object side of the image pickup lens, wherein the first lens, the aperture stop, the second lens and the third lens are arranged in this order form an object side of the image pickup lens, and the image pickup lens satisfies following expressions:

$$0.20 < R_1/f < 0.40$$

$$-3.0 < (R_5+R_6)/(R_5-R_6) < 0,$$

where $R_1$ is a curvature radius of the object side of the first lens, f is a focal length of a total system of the image pickup lens, $R_5$ is a curvature radius of the object side of the third lens, and $R_6$ is a curvature radius of the image side of the third lens.

2. The image pickup lens of claim 1, satisfying $$0.1 < D_{12}/f < 0.3,$$

where $D_{12}$ is a distance along an optical axis of an air space between the first lens and the second lens, and f is a focal length of a total system of the image pickup lens.

3. The image pickup lens of claim 1, satisfying $$-5.0 < P_{air}/P < -1.3,$$

where P is a refractive power of a total system of the image pickup lens, $P_{air}$ is a refractive power of an air lens formed by an image side surface of the first lens and an object side surface of the second lens and is represented by $$P_{air} = (1-n_1)/R_2 + (n_2-1)/R_3 - \{((1-n_1) \times (n_2--1))/(R_2 \times R_3)\} \times D_{12}$$

where $n_1$ is a refractive index of the first lens for d-line, $n_2$ is a refractive index of the second lens for d-line, $R_2$ is a curvature radius of an image side of the first lens, $R_3$ is a curvature radius of an object side of the second lens, and $D_{12}$ is a distance along an optical axis of an air space between the first lens and the second lens.

4. The image pickup lens of claim 1, wherein each of the first lens, the second lens, and the third lens is formed of a plastic material.

5. An image pickup lens for forming image of a subject on a solid-state image pickup element comprising:

a first lens having a positive refractive power in a meniscus shape whose convex surface faces to an object side of the image pickup lens;

an aperture stop;

a second lens having a positive refractive power in a meniscus shape whose convex surface faces to an image side of the image pickup lens;

a third lens having a negative refractive power whose concave surface faces to an object side of the image pickup lens, wherein the first lens, the aperture stop, the second lens and the third lens are arranged in this order form an object side of the image pickup lens, the third lens has an object side surface in an aspheric shape such that a position of the object side surface has a smaller negative refractive power as the position is moved from a center to a periphery of the object side surface, and the image pickup lens satisfies a following expression:

$$0.20 < R_1/f < 0.40$$

where $R_1$ is a curvature radius of the object side of the first lens, and f is a focal length of a total system of the image pickup lens.

6. The image pickup lens of claim 5, satisfying $$0.1 < D_{12}/f < 0.3$$

where $D_{12}$ is a distance of the air space along an optical axis between the first lens and the second lens, and f is a focal length of a total system of the image pickup lens.

7. An image pickup apparatus comprising:

a solid-state image pickup element having a photoelectric converter;

an image pickup lens of claim 1 for forming image of a subject to the photoelectric converter of the solid-state image pickup element;

a substrate supporting the solid-state image pickup element and having an external connecting terminal for receiving or transmitting electrical signal; and a casing having an opening aperture for entering a light flux from an object side of the image pickup apparatus and comprising a light shielding member, wherein the solid-state image pickup element, the image pickup lens, the substrate, and the casing are formed in one body, and a height of the image pickup lens along an optical axis is 10 mm or less.

8. An image pickup apparatus comprising:

a solid-state image pickup element having a photoelectric converter;

an image pickup lens of claim 5 for forming image of a subject to the photoelectric converter of the solid-state image pickup element;

a substrate supporting the solid-state image pickup element and having an external connecting terminal for receiving or transmitting electrical signal; and a casing having an opening aperture for entering a light flux from an object side of the image pickup apparatus and comprising a light shielding member, wherein the solid-state image pickup element, the image pickup lens, the substrate, and the casing are formed in one body, and a height of the image pickup lens along an optical axis is 10 mm or less.

9. A mobile terminal comprising: the image pickup apparatus of claim 7 or 8.

* * * * *